US012288523B2

(12) United States Patent
Kim et al.

(10) Patent No.: US 12,288,523 B2
(45) Date of Patent: *Apr. 29, 2025

(54) MULTI -FREQUENCY MODE DISPLAY DEVICE

(71) Applicant: Samsung Display Co., Ltd., Yongin-si (KR)

(72) Inventors: Soon-Dong Kim, Osan-si (KR); Taehoon Kim, Hwaseong-si (KR); Jin-Wook Yang, Suwon-si (KR); Eun Sil Yun, Hwaseong-si (KR); Changnoh Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,946

(22) Filed: Sep. 15, 2023

(65) Prior Publication Data

US 2024/0005868 A1 Jan. 4, 2024

Related U.S. Application Data

(63) Continuation of application No. 17/863,805, filed on Jul. 13, 2022, now Pat. No. 11,862,096.

(30) Foreign Application Priority Data

Oct. 5, 2021 (KR) ........................ 10-2021-0131783

(51) Int. Cl.
*G09G 3/3258* (2016.01)

(52) U.S. Cl.
CPC ... *G09G 3/3258* (2013.01); *G09G 2310/0278* (2013.01); *G09G 2330/021* (2013.01)

(58) Field of Classification Search
CPC ......... G09G 3/3258; G09G 2310/0278; G09G 2330/021
See application file for complete search history.

(56) References Cited

U.S. PATENT DOCUMENTS 10,922,516 B2 2/2021 Kim et al.
10,937,370 B2 3/2021 Son
11,049,451 B2 6/2021 Park et al.
(Continued)

FOREIGN PATENT DOCUMENTS

KR 1020190046135 A 5/2019
KR 1020200015869 A 2/2020
(Continued)

*Primary Examiner* — Sejoon Ahn
(74) *Attorney, Agent, or Firm* — CANTOR COLBURN LLP

(57) ABSTRACT

Disclosed is a display device including a display panel including a plurality of pixels and a voltage generator providing an anode initialization voltage to the pixels. The display panel is divided into a first display area operating at a first operating frequency and a second display area operating at a second operating frequency. While pixels, which correspond to the first display area, from among the plurality of pixels are driven, the anode initialization voltage has a first voltage level. While pixels in the second display area from among the plurality of pixels are driven, the anode initialization voltage has a second voltage level different from the first voltage level.

20 Claims, 22 Drawing Sheets

(56) References Cited

U.S. PATENT DOCUMENTS

| | | | | |
|---|---|---|---|---|
| 11,217,178 | B2 | 1/2022 | Oh et al. | |
| 2017/0004759 | A1* | 1/2017 | Yin | G09G 3/2092 |
| 2017/0011676 | A1* | 1/2017 | Wu | G09G 3/32 |
| 2017/0011687 | A1* | 1/2017 | Li | G09G 3/3258 |
| 2017/0011700 | A1* | 1/2017 | Kim | G09G 3/3688 |
| 2017/0017283 | A1* | 1/2017 | Seo | G06F 3/16 |
| 2018/0373317 | A1* | 12/2018 | Ying | G06F 1/3218 |
| 2018/0374425 | A1* | 12/2018 | Jeong | G06F 3/0412 |
| 2018/0374440 | A1* | 12/2018 | Chen | G09G 3/3614 |
| 2019/0347976 | A1* | 11/2019 | Um | G09G 3/2074 |
| 2019/0355296 | A1* | 11/2019 | Ji | G02F 1/133603 |
| 2019/0355307 | A1* | 11/2019 | Nam | G09G 3/2092 |
| 2019/0356226 | A1* | 11/2019 | Lin | H02M 3/157 |
| 2019/0362665 | A1* | 11/2019 | Chang | H01L 23/60 |
| 2021/0142733 | A1 | 5/2021 | Kim et al. | |

FOREIGN PATENT DOCUMENTS

| | | | |
|---|---|---|---|
| KR | 1020200057204 | A | 5/2020 |
| KR | 1020200140152 | A | 12/2020 |
| KR | 1020210013477 | A | 2/2021 |
| KR | 1020210055146 | A | 5/2021 |
| KR | 1020210057277 | A | 5/2021 |

* cited by examiner

MULTI -FREQUENCY MODE DISPLAY DEVICE

This application is a continuation of U.S. patent application Ser. No. 17/863,805, filed on Jul. 13, 2022, which claims priority to Korean Patent Application No. 10-2021-0131783, filed on Oct. 5, 2021, and all the benefits accruing therefrom under 35 U.S.C. § 119, the content of which in its entirety is herein incorporated by reference.

BACKGROUND

Embodiments of the present disclosure described herein relate to a display device.

An organic light emitting display device includes pixels connected to data lines and scan lines. Each of the pixels generally includes an organic light emitting diode, and a circuit unit for controlling the amount of current flowing to the organic light emitting diode. In response to a data signal, the circuit unit controls the amount of current that flows from a first driving voltage to a second driving voltage through the organic light emitting diode. In this case, there is generated a light of luminance corresponding to the amount of current flowing through the organic light emitting diode.

Nowadays, there is a lot of work going on to reduce power consumption of a display device.

SUMMARY

Embodiments of the present disclosure provide a display device capable of reducing power consumption and preventing display quality deterioration.

According to an embodiment, a display device includes: a display panel including a plurality of pixels; and a voltage generator for providing an anode initialization voltage to the pixels. The display panel is divided into a first display area for operating at a first operating frequency and a second display area for operating at a second operating frequency. While pixels, which correspond to the first display area, from among the plurality of pixels are driven, the anode initialization voltage has a first voltage level. While pixels in the second display area from among the plurality of pixels are driven in a certain frame in a multi-frequency mode, the anode initialization voltage has a second voltage level different from the first voltage level.

In an embodiment, the display device may further include a driving controller which determines an operating mode and outputs a voltage control signal for changing a voltage level of the anode initialization voltage at which the second display area is driven when the operating mode is the multi-frequency mode. The voltage generator may output the anode initialization voltage in response to the voltage control signal.

In an embodiment, the second operating frequency may be lower than the first operating frequency.

In an embodiment, the second voltage level of the anode initialization voltage may be higher than the first voltage level.

In an embodiment, when a part of the first display area adjacent to the second display area and a part of the second display area adjacent to the first display area are driven, the anode initialization voltage may be changed step by step from the first voltage level to the second voltage level.

In an embodiment, each of the plurality of pixels may include: a light emitting element including an anode and a cathode; and a transistor connected between the anode of the light emitting element and a voltage line. The anode initialization voltage may be provided from the voltage line.

In an embodiment, the display device may further include: a first voltage line electrically connected to the pixels corresponding to the first display area; and a second voltage line electrically connected to the pixels corresponding to the second display area. The anode initialization voltage may include a first anode initialization voltage and a second anode initialization voltage. The voltage generator may provide the first anode initialization voltage to the first voltage line and provide the second anode initialization voltage to the second voltage line.

In an embodiment, while the pixels of the second display area is driven when the second operating frequency is lower than the first operating frequency, a voltage level of the second anode initialization voltage may be lower than a voltage level of the first anode initialization voltage.

In an embodiment, when the second operating frequency is identical to the first operating frequency, each of the first anode initialization voltage and the second anode initialization voltage may have the same voltage level.

In an embodiment, each of the pixels corresponding to the first display area may include: a light emitting element including an anode and a cathode; and a transistor connected between the anode of the light emitting element and the first voltage line.

In an embodiment, each of the pixels corresponding to the second display area may include: a light emitting element including an anode and a cathode; and a transistor connected between the anode of the light emitting element and the second voltage line.

According to an embodiment, a display device includes: a display panel divided into a first display area and a second display area and including a first pixel positioned in the first display area and a second pixel positioned in the second display area; a voltage generator, which provides a first anode initialization voltage to the first pixel in response to a voltage control signal and provides a second anode initialization voltage to the second pixel in response to the voltage control signal; and a driving controller which determines an operating mode, when the determined operating mode is a multi-frequency mode, drives the first pixel at a first operating frequency and drive the second pixel at a second operating frequency, and outputs the voltage control signal. The driving controller provides a valid data signal to the first pixel and the second pixel during a first frame in the multi-frequency mode, provides the valid data signal to the first pixel during a second frame in the multi-frequency mode, and provides an invalid data signal to the second pixel. During the second frame in the multi-frequency mode, the first anode initialization voltage has a first voltage level and the second anode initialization voltage has a second voltage level different from the first voltage level.

In an embodiment, the second operating frequency may be lower than the first operating frequency.

In an embodiment, the second voltage level of the second anode initialization voltage may be lower than the first voltage level of the first anode initialization voltage.

In an embodiment, the driving controller may output the voltage control signal in synchronization with a vertical synchronization signal.

In an embodiment, in the multi-frequency mode, the second anode initialization voltage may be changed from the first voltage level to the second voltage level during a blank section of the vertical synchronization signal.

In an embodiment, when the determined operating mode is a low frequency mode, the driving controller may drive each of the first pixel and the second pixel at a third operating frequency lower than the first operating frequency. The driving controller may provide the valid data signal to the first pixel and the second pixel during a first frame in the low frequency mode, may provide the invalid data signal to the first pixel and the second pixel during a second frame in the low frequency mode. During the first frame in the low frequency mode, each of the first anode initialization voltage and the second anode initialization voltage may have the first voltage level. During the second frame in the low frequency mode, each of the first anode initialization voltage and the second anode initialization voltage may have the second voltage level.

In an embodiment, when the determined operating mode is a single frequency mode, the driving controller may drive the first pixel and the second pixel at the first operating frequency. The driving controller may provide the valid data signal to the first pixel and the second pixel during each frame in the single frequency mode. Each of the first anode initialization voltage and the second anode initialization voltage may have the first voltage level during each frame in the single frequency mode.

In an embodiment, the display device may further include a first voltage line electrically connected to the first pixel and a second voltage line electrically connected to the second pixel. The voltage generator may provide the first anode initialization voltage to the first voltage line and provides the second anode initialization voltage to the second voltage line.

In an embodiment, the first pixel may include a light emitting element including an anode and a cathode and a transistor connected between the anode of the light emitting element and the first voltage line.

In an embodiment, the second pixel may include a light emitting element including an anode and a cathode and a transistor connected between the anode of the light emitting element and the second voltage line.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
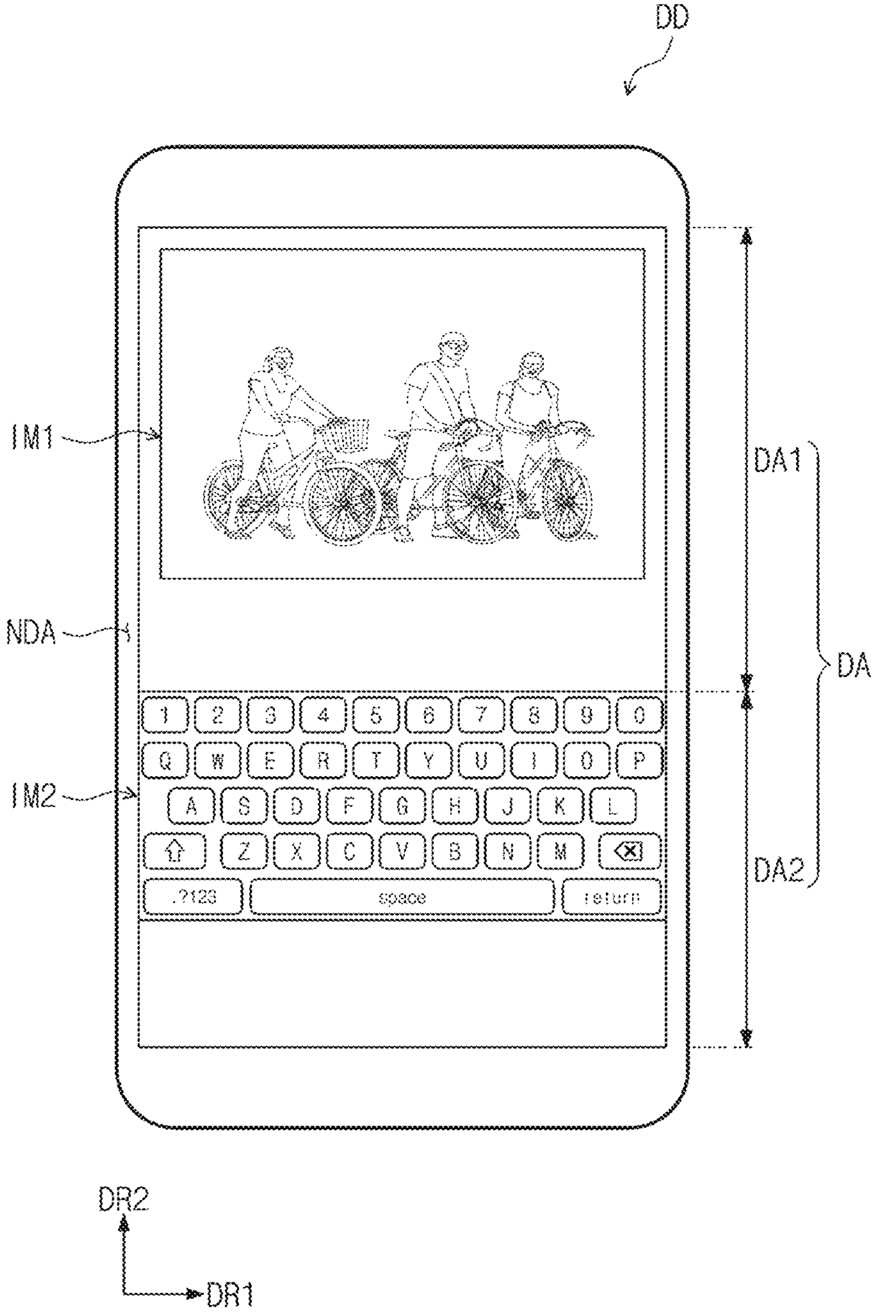
FIG. 1 illustrates a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 illustrates a display device, according to an embodiment of the present disclosure.

Referring to FIG. 1, a portable terminal is illustrated as an example of a display device DD according to an embodiment of the present disclosure. The portable terminal may include a tablet PC, a smartphone, a personal digital assistant ("PDA"), a portable multimedia player ("PMP"), a game console, a wristwatch-type electronic device, and the like. However, the present disclosure is not limited thereto. The present disclosure may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it is obvious that the display device DD may be applied to any other electronic device(s) without departing from the concept of the present disclosure.

As shown in FIG. 1, a display surface, on which a first image IM1 and a second image IM2 are displayed, is parallel to a plane defined by a first direction DR1 and a second direction DR2. The display device DD includes a plurality of areas separated on a display surface. The display surface includes a display area DA, in which the first image IM1 and the second image IM2 are displayed, and a non-display area NDA adjacent to the display area DA. The non-display area NDA may be referred to as a bezel area. For example, the display area DA may have a rectangular shape. The non-display area NDA surrounds the display area DA. Also, although not illustrated, for example, the display device DD may include a partially-curved shape. As a result, one area of the display area DA may have a curved shape.

The display area DA of the display device DD includes a first display area DA1 and a second display area DA2. In a specific application program, the first image IM1 may be displayed on the first display area DA1, and the second image IM2 may be displayed on the second display area DA2. For example, the first image IM1 may be a video, and the second image IM2 may be a still image or text information having a long change period.

According to an embodiment, the display device DD may drive the first display area DA1, in which the video is displayed, at a normal frequency or a frequency higher than the normal frequency, and may drive the second display area DA2, in which the still image is displayed, at a frequency lower than the normal frequency. The display device DD may reduce power consumption by lowering the operating frequency of the second display area DA2.

The size of each of the first display area DA1 and the second display area DA2 may be a preset size, and may be changed by an application program. In an embodiment, when the still image is displayed in the first display area DA1 and the video is displayed in the second display area DA2, the first display area DA1 may be driven at a frequency lower than the normal frequency, and the second display area DA2 may be driven at the normal frequency or a frequency higher than the normal frequency. Besides, the display area DA may be divided into three or more display areas. An operating frequency of each of the display areas may be determined depending on the type (a still image or video) of an image displayed in each of the display areas.

Figure 2A:
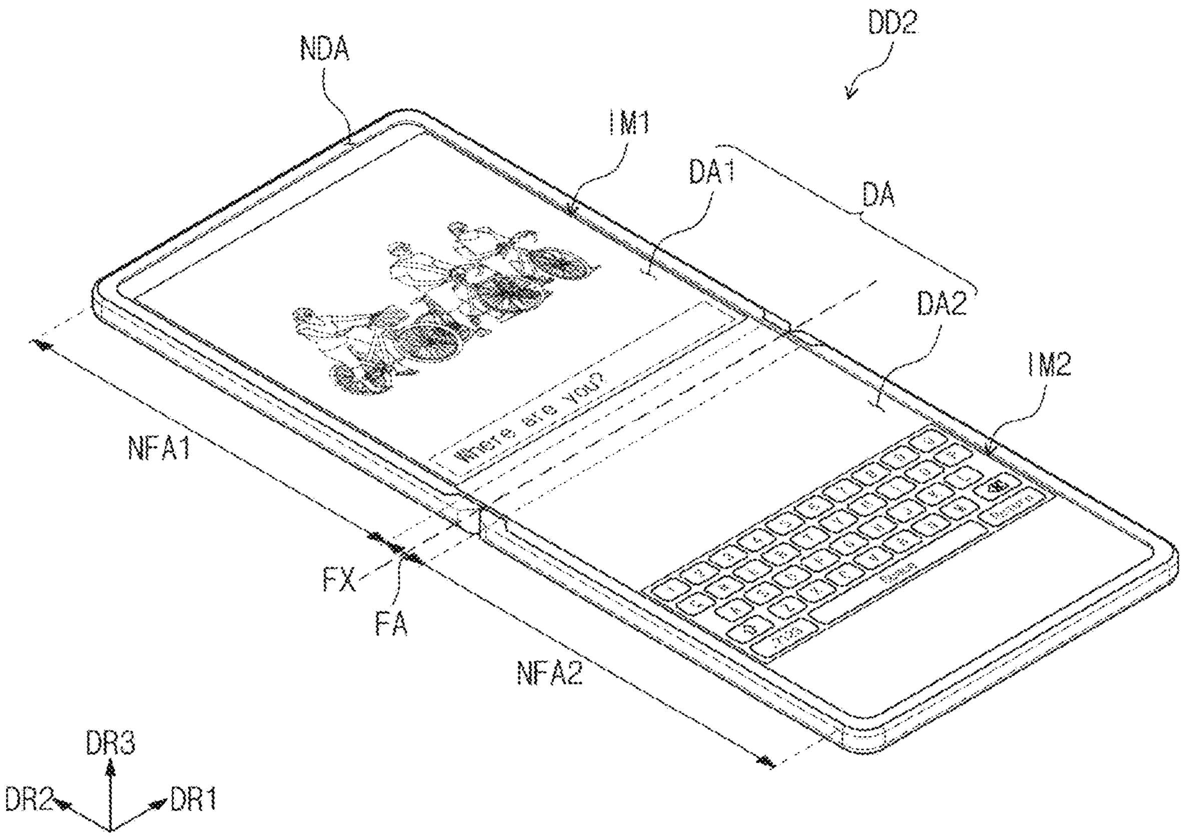
FIGS. 2A and 2B are perspective views of a display device, according to an embodiment of the present disclosure.
Figure 2B:
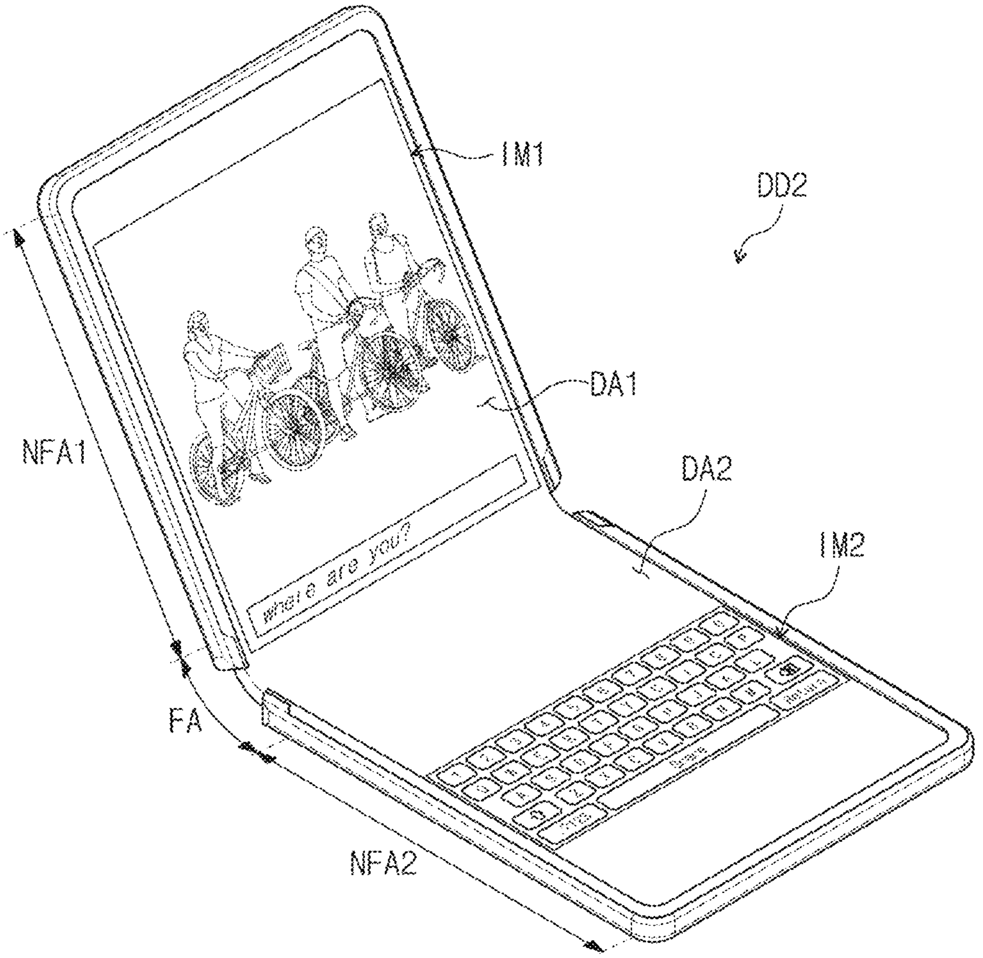

FIGS. 2A and 2B are perspective views of a display device DD2, according to an embodiment of the present disclosure. FIG. 2A illustrates the display device DD2 in an unfolded state. FIG. 2B illustrates the display device DD2 in a folded state.

As shown in FIGS. 2A and 2B, the display device DD2 includes the display area DA and the non-display area NDA. The display device DD2 may display an image through the display area DA. The display area DA may include a plane defined by the first direction DR1 and the second direction DR2, in a state where the display device DD2 is unfolded. The thickness direction of the display device DD2 may be parallel to a third direction DR3 crossing the first direction DR1 and the second direction DR2. Accordingly, the front surfaces (or upper surfaces) and the bottom surfaces (or lower surfaces) of the members constituting the display device DD2 may be defined based on the third direction DR3. The non-display area NDA may be referred to as a bezel area. For example, the display area DA may have a rectangular shape. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as "in-folding". However, embodiments are not limited thereto and the operation of the display device DD2 is not limited thereto.

In an embodiment of the present disclosure, when the display device DD2 is folded, the first non-folding area NFA1 and the second non-folding area NFA2 may be opposite to each other. Accordingly, in a state where the display device DD2 is folded, the first non-folding area NFA1 may be exposed to the outside, which may be referred to as "out-folding".

The display device DD2 may perform only one operation of an in-folding operation or an out-folding operation. Alternatively, the display device DD2 may perform both the in-folding operation and the out-folding operation. In this case, the same area of the display device DD2, for example, the folding area FA may be folded inwardly and outwardly. Alternatively, some areas of the display device DD2 may be folded inwardly, and other areas may be folded outwardly.

One folding area and two non-folding areas are illustrated in FIGS. 2A and 2B, but the number of folding areas and the number of non-folding areas are not limited thereto. For example, the display device DD2 may include a plurality of non-folding areas, of which the number is greater than two, and a plurality of folding areas interposed between non-folding areas adjacent to one another.

FIGS. 2A and 2B illustrates that the folding axis FX is parallel to the minor axis of the display device DD2. However, the present disclosure is not limited thereto. For example, the folding axis FX may extend in a direction parallel to the major axis of the display device DD2, for example, the second direction DR2.

FIGS. 2A and 2B illustrates that the first non-folding area NFA1, the folding area FA, and the second non-folding area NFA2 may be sequentially arranged in the second direction DR2. However, the present disclosure is not limited thereto. For example, the first non-folding area NFA1, the folding area FA, and the second non-folding area NFA2 may be sequentially arranged in the first direction DR1.

The plurality of display areas DA1 and DA2 may be defined in the display area DA of the display device DD2. FIG. 2A illustrates the two display areas DA1 and DA2 as an example. However, the number of display areas DA1 and DA2 is not limited thereto.

The plurality of display areas DA1 and DA2 may include the first display area DA1 and the second display area DA2. For example, the first display area DA1 may be an area where the first image IM1 is displayed, and the second display area DA2 may be an area in which the second image IM2 is displayed. For example, the first image IM1 may be a video, and the second image IM2 may be a still image or an image (text information or the like) having a long change period.

The display device DD2 according to an embodiment may operate differently depending on an operating mode. The operating mode may include a single frequency mode and a multi-frequency mode. In the single frequency mode, the display device DD2 may drive both the first display area DA1 and the second display area DA2 at a normal frequency. In the multi-frequency mode, the display device DD2 according to an embodiment may drive the first display area DA1 where the first image IM1 is displayed at a first operating frequency, and may drive the second display area DA2 where the second image IM2 is displayed, at a second operating frequency lower than the normal frequency. In one embodiment, the first operating frequency may be equal to or higher than the normal frequency.

The size of each of the first display area DA1 and the second display area DA2 may be a preset size, and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entire folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, the size of the second display area DA2 may be greater than the size of the first display area DA1. In an embodiment, the first display area DA1 may correspond to the first non-folding area NFA1, the folding area FA, and the first portion of the second non-folding area NFA2, and the second display area DA2 may be the second portion of the second non-folding area NFA2. That is, the size of the first display area DA1 may be greater than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

FIGS. 2A and 2B illustrates that the display device DD2 has one folding area, as an example of a display device. However, the present disclosure is not limited thereto. For example, the present disclosure may also be applied to a display device having two or more folding areas, a rollable display device, or a slidable display device.

Hereinafter, the display device DD shown in FIG. 1 will be described as an example. However, the display device DD shown in FIG. 1 may be identically applied to the display device DD2 shown in FIGS. 2A and 2B.

Figure 3A:
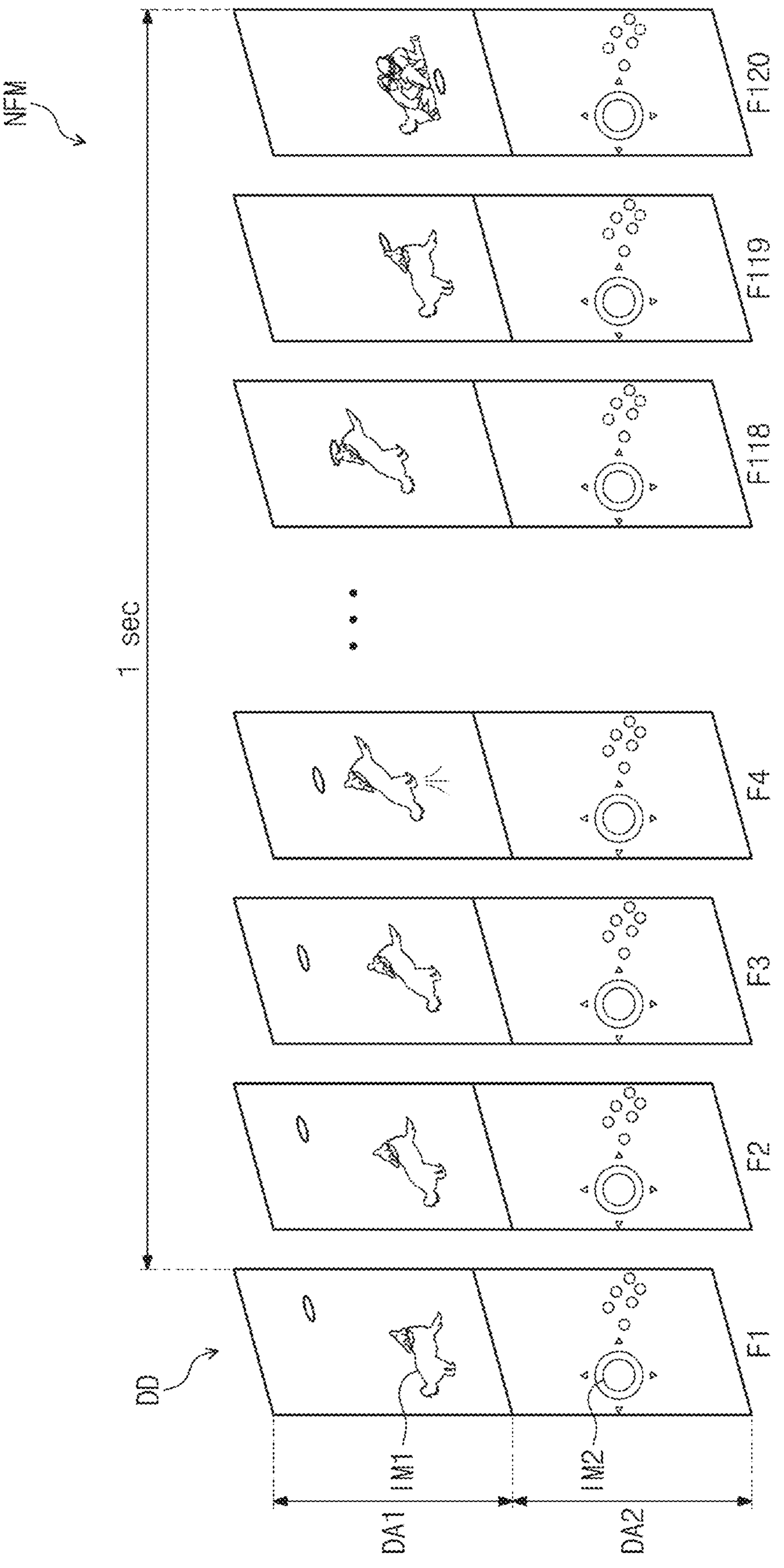
FIG. 3A is a diagram for describing an operation of a display device in a single frequency mode.
Figure 3B:
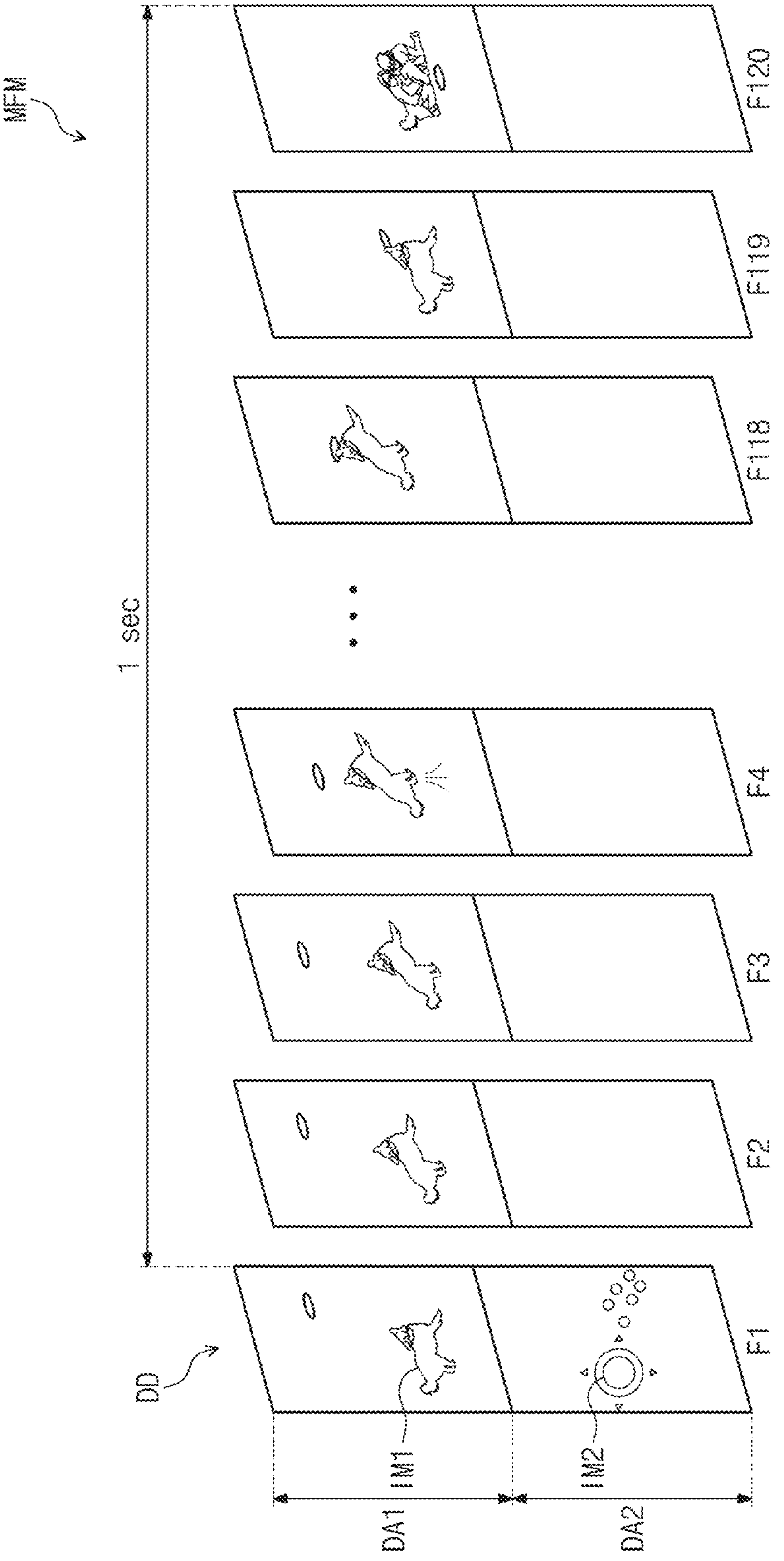
FIG. 3B is a diagram for describing an operation of a display device in a multi-frequency mode.

FIG. 3A is a diagram for describing an operation of a display device in a single frequency mode. FIG. 3B is a diagram for describing an operation of a display device in a multi-frequency mode.

Referring to FIG. 3A, the first image IM1 displayed in the first display area DA1 may be a video. The second image IM2 displayed in the second display area DA2 may be a still image or an image (e.g., a keypad for manipulating a game) having a long change period. That is, the still image is not changed for a relative long time, compared to the video. The first image IM1 displayed in the first display area DA1 shown in FIG. 1 and the second image IM2 displayed in the second display area DA2 are examples, and various images may be displayed on the display device DD.

In a single frequency mode NFM, the operating frequencies of the first display area DA1 and the second display area DA2 of the display device DD are the same and a normal frequency. For example, the normal frequency may be 120 Hertz (Hz). In the single frequency mode NFM, 120 frames (i.e., images of first to 120th frames F1 to F120) may be sequentially displayed for 1 second in the first display area DA1 and the second display area DA2 of the display device DD.

Referring to FIG. 3B, in the multi-frequency mode MFM, the display device DD may set an operating frequency of the first display area DA1, in which the first image IM1 is displayed, as the first operating frequency, and may set an operating frequency of the second display area DA2, in which the second image IM2 is displayed, as a second operating frequency lower than the first operating frequency. In an embodiment, the first image IM1 may be a video, and the second image IM2 may be a still image. In an embodiment, the first operating frequency may be 120 Hz, and the second operating frequency may be 1 Hz. The first operating frequency and the second operating frequency may be variously changed.

In the multi-frequency mode MFM, when the first operating frequency is 120 Hz and the second operating frequency is 1 Hz, a data signal corresponding to the first image IM1 may be provided to the display panel DP (see FIG. 4) in the first display area DA1 of the display device DD for in each of the first to 120th frames F1 to F120. The second image IM2 may be displayed only in the first frame F1 in the second display area DA2, and an image may not be displayed in the remaining frames F2 to F120. The operation of the display device DD in the multi-frequency mode MFM will be described in detail later.

Figure 4:
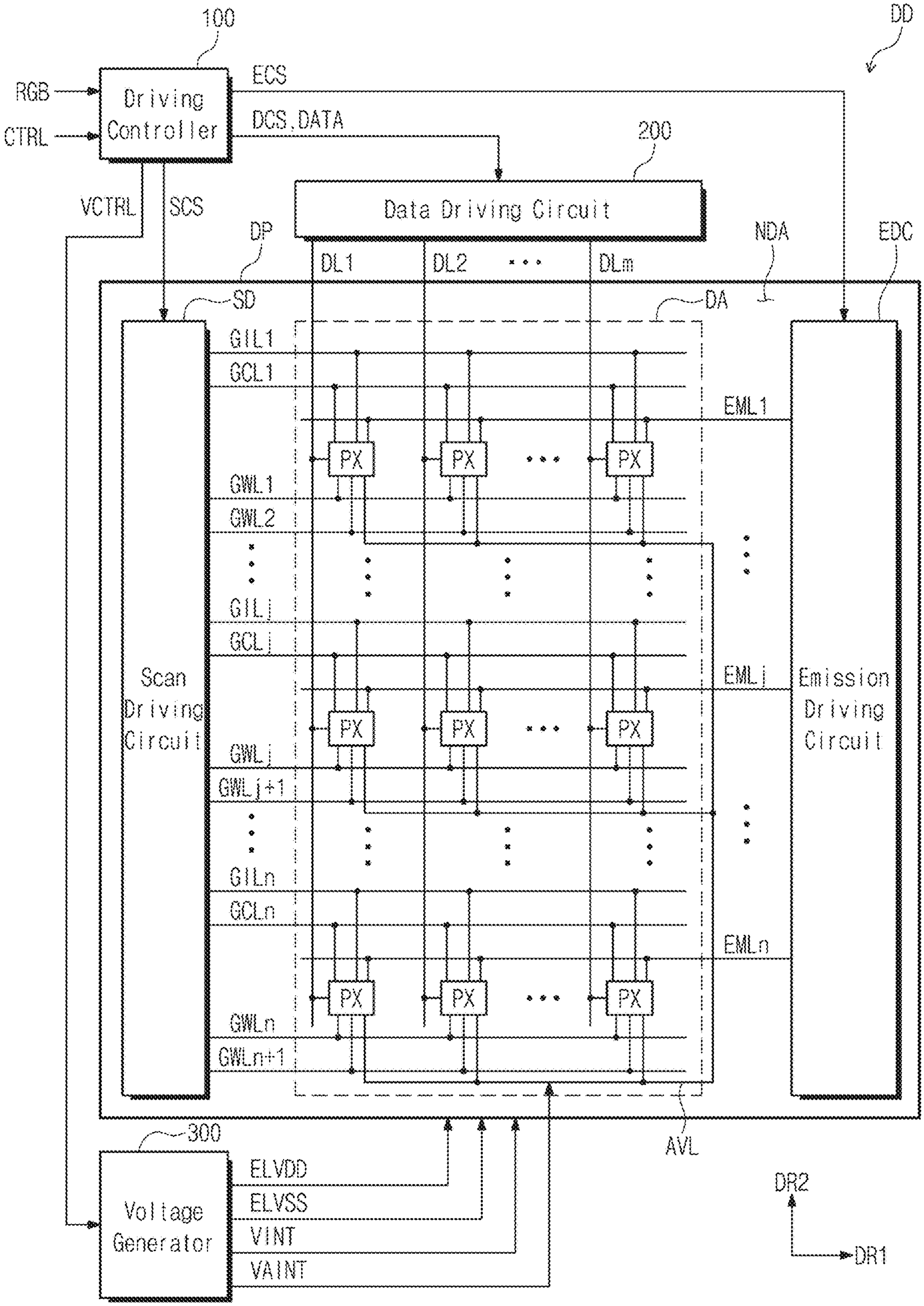
FIG. 4 is a block diagram of a display device according to an embodiment of the present disclosure.

FIG. 4 is a block diagram of a display device according to an embodiment of the present disclosure.

Referring to FIG. 4, a display device DD includes a display panel DP, a driving controller 100, a data driving circuit 200, and a voltage generator 300.

The driving controller 100 receives an image signal RGB and a control signal CTRL. The driving controller 100 generates an output image signal DATA by converting a data format of an image signal RGB so as to be suitable for the interface specification of the data driving circuit 200. The driving controller 100 outputs a scan control signal SCS, a data control signal DCS, and a light emitting driving signal ECS.

The data driving circuit 200 receives the data control signal DCS and the output image signal DATA provided from the driving controller 100. The data driving circuit 200 converts the output image signal DATA into data signals and then outputs the data signals to a plurality of data lines DL1 to DLm to be described later. The data signals refer to analog voltages corresponding to a grayscale value of the output image signal DATA.

The display panel DP includes scan lines GIL1 to GILn, GCL1 to GCLn, and GWL1 to GWLn+1, emission control lines EML1 to EMLn, the data lines DL1 to DLm and the pixels PX. The display panel DP may further include a scan driving circuit SD and an emission driving circuit EDC. In an embodiment, the scan driving circuit SD may be arranged on a first side of the display panel DP. The scan lines GIL1 to GILn, GCL1 to GCLn, and GWL1 to GWLn+1 extend from the scan driving circuit SD in the first direction DR1.

The emission driving circuit EDC is arranged on a second side of the display panel DP. The emission control lines EML1 to EMLn extend from the emission driving circuit EDC in a direction opposite to the first direction DR1.

The scan lines GIL1 to GILn, GCL1 to GCLn, and GWL1 to GWLn+1 and the emission control lines EML1 to EMLn are arranged to be spaced from one another in the second direction DR2. The data lines DL1 to DLm extend from the data driving circuit 200 in a direction opposite to the second direction DR2, and are arranged spaced from one another in the first direction DR1.

In the example shown in FIG. 4, the scan driving circuit SD and the emission driving circuit EDC are arranged to face each other with the pixels PX interposed therebetween, but the present disclosure is not limited thereto. For example, the scan driving circuit SD and the emission driving circuit EDC may be positioned adjacent to each other on one of the first side and the second side of the display panel DP in another embodiment. In still another embodiment, the scan driving circuit SD and the emission driving circuit EDC may be implemented with one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. For example, as shown in FIG. 4, pixels PX in a first row each may be connected to the scan lines GIL1, GCL1, GWL1, and GWL2 and the emission control line EML1. Furthermore, pixels PX in a j-th row each may be connected to the scan lines GILj, GCLj, GWLj, and GWLj+1 and the emission control line EMLj.

Each of the plurality of pixels PX includes a light emitting element ED (see FIG. 5) and a pixel circuit PXC (see FIG. 5) for controlling the light emission of the light emitting element ED. The pixel circuit PXC may include one or more transistors and one or more capacitors. The scan driving circuit SD and the emission driving circuit EDC may include transistors formed through the same process as the pixel circuit PXC.

Each of the plurality of pixels PX receives a first driving voltage ELVDD, a second driving voltage ELVSS, an initialization voltage VINT, and an anode initialization voltage VAINT provided from the voltage generator 300.

The scan driving circuit SD receives the scan control signal SCS provided from the driving controller 100. The scan driving circuit SD may output scan signals to the scan lines GIL1 to GILn, GCL1 to GCLn, and GWL1 to GWLn+1 in response to the scan control signal SCS. The circuit configuration and operation of the scan driving circuit SD will be described in detail later.

According to one embodiment, the driving controller 100 may divide the display panel DP into the first display area DA1 (see FIG. 1) and the second display area DA2 (see FIG. 1) based on the image signal RGB and the control signal CTRL, and may set an operating frequency of each of the first display area DA1 and the second display area DA2. For example, in a normal mode, the driving controller 100 drives the first display area DA1 and the second display area DA2 at a normal frequency (e.g., 120 Hz). In a multi-frequency mode, the driving controller 100 may drive the first display area DA1 at a first operating frequency (e.g., 120 Hz) and the second display area DA2 at a second operating frequency (e.g., 1 Hz). In an embodiment, in the multi-frequency mode, a first operating frequency of the first display area DA1 may be lower than or equal to a normal frequency, and a second operating frequency of the second display area DA2 may be lower than the normal frequency. However, the present disclosure is not limited thereto. For example, in the multi-frequency mode, the first operating frequency of the first display area DA1 and the second operating frequency of the second display area DA2 may be variously changed.

The voltage generator 300 generates voltages to operate the display panel DP. In an embodiment, the voltage generator 300 generates the first driving voltage ELVDD, the second driving voltage ELVSS, the initialization voltage VINT, and the anode initialization voltage VAINT.

The driving controller 100 according to an embodiment of the present disclosure may output a voltage control signal VCTRL for controlling an operation of the voltage generator 300. In an embodiment, the voltage generator 300 may change a voltage level of the anode initialization voltage VAINT in response to the voltage control signal VCTRL.

In an embodiment, when the second display area DA2 (see FIG. 1) is driven at a second operating frequency lower than the normal frequency, the driving controller 100 may output the voltage control signal VCTRL such that the voltage level of the anode initialization voltage VAINT provided to the pixels PX of the second display area DA2 is changed.

In this specification, it is described that the voltage generator 300 operates in response to the voltage control signal VCTRL provided from the driving controller 100, but the present disclosure is not limited thereto. In an embodiment, the voltage generator 300 may operate in response to a voltage control signal provided from various host devices such as an application processor, a graphic processor, a central processing unit ("CPU"), and the like.

Figure 5:
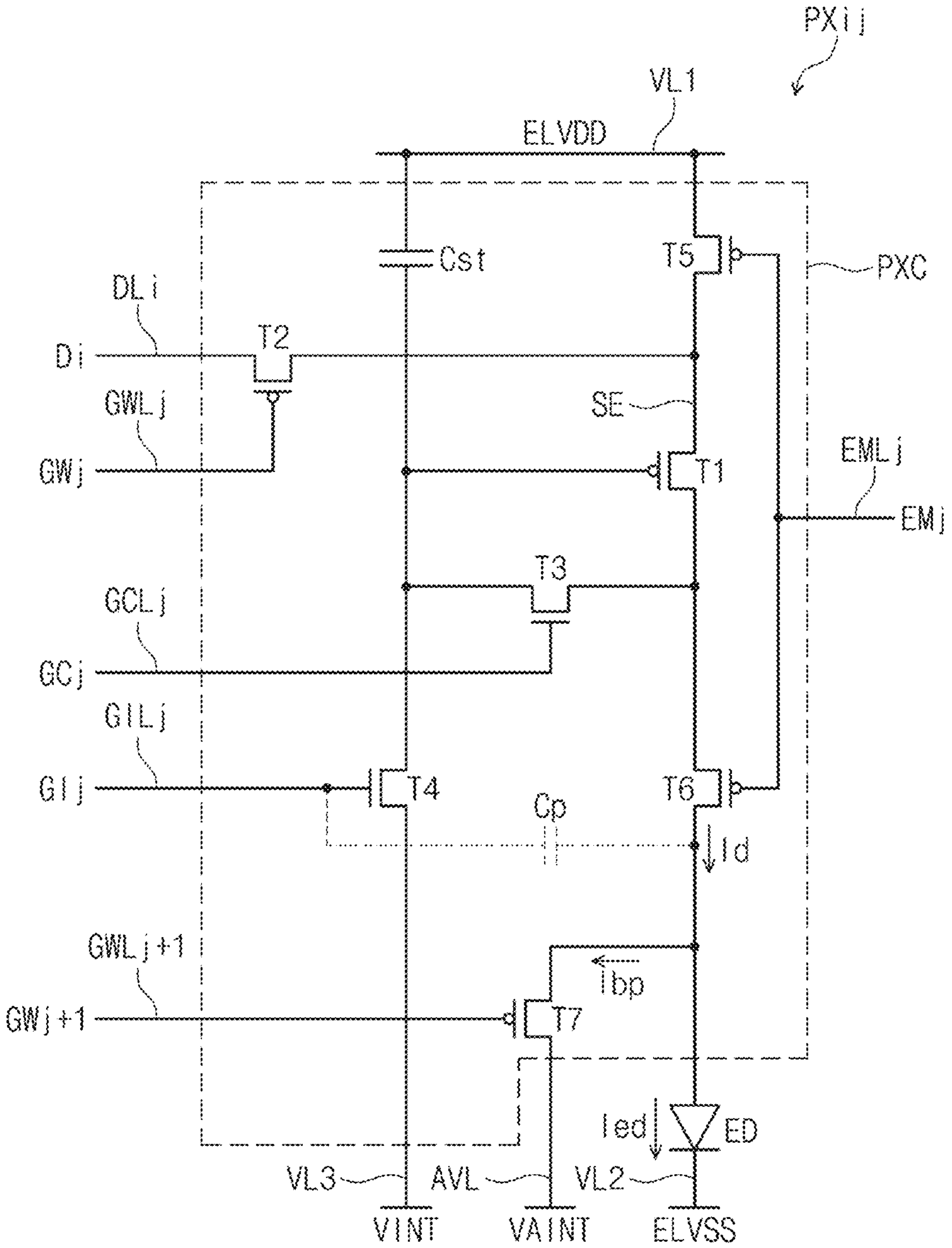
FIG. 5 is an equivalent circuit diagram of a pixel, according to an embodiment of the present disclosure.

FIG. 5 is an equivalent circuit diagram of a pixel, according to an embodiment of the present disclosure.

FIG. 5 illustrates an equivalent circuit diagram of a pixel PXij connected to the i-th data line DLi among the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th emission control line EMLj among the emission control lines EML1 to EMLn, which are illustrated in FIG. 4.

Each of the plurality of pixels PX shown in FIG. 4 may have the same circuit configuration as the equivalent circuit diagram of the pixel PXij shown in FIG. 5.

Referring to FIG. 5, a pixel PXij according to an embodiment includes a pixel circuit PXC and at least one light emitting element ED. The pixel circuit PXC includes first to seventh transistors T1, T2, T3, T4, T5, T6, and T7 and a capacitor Cst. In an embodiment, the light emitting element ED may be a light emitting diode. In an embodiment, it is described that the one pixel PXij includes one light emitting element ED.

The third and fourth transistors T3 and T4 among the first to seventh transistors T1 to T7 are N-type transistors by using an oxide semiconductor as a semiconductor layer. Each of the first, second, fifth, sixth, and seventh transistors T1, T2, T5, T6, and T7 is a P-type transistor having a low-temperature polycrystalline silicon ("LTPS") semiconductor layer. However, the present disclosure is not limited thereto, and all of the first to seventh transistors T1 to T7 may be P-type transistors or N-type transistors. In an embodiment, at least one of the first to seventh transistors T1 to T7 may be an N-type transistor, and the remaining transistors may be P-type transistors. Moreover, the circuit configuration of a pixel according to an embodiment of the present disclosure is not limited to FIG. 5. The pixel circuit PXC illustrated in FIG. 5 is only an example. For example, the configuration of the pixel circuit PXC may be modified and implemented.

The scan lines GILj, GCLj, GWLj, and GWLj+1 may deliver scan signals GIj, GCj, GWj, and GWj+1, respectively. The emission control line EMLj may deliver an emission control signal EMj. The data line DLi delivers a data signal Di. The data signal Di may have a voltage level corresponding to the image signal RGB input to the display device DD (see FIG. 4). The first to third driving voltage lines VL1, VL2, and VL3 may deliver the first driving voltage ELVDD, the second driving voltage ELVSS, and the initialization voltage VINT to the pixel PXij, respectively. A voltage line AVL may deliver the anode initialization voltage VAINT.

The first transistor T1 includes a first electrode SE connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Di delivered by the data line DLi depending on the switching operation of the second transistor T2 and then may supply a driving current Id to the light emitting element ED.

The second transistor T2 includes a first electrode connected to the data line DLi, a second electrode connected to the first electrode SE of the first transistor T1, and a gate electrode connected to the scan line GWLj. The second transistor T2 may be turned on depending on the scan signal GWj received through the scan line GWLj and then may deliver the data signal Di delivered from the data line DLi to the first electrode SE of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third driving voltage line VL3 through which the initialization voltage VINT is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by supplying the initialization voltage VINT to the gate electrode of the first transistor T1.

The fifth transistor T5 includes a first electrode connected to the first driving voltage line VL1, a second electrode connected to the first electrode SE of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 may be simultaneously turned on depending on the emission control signal EMj received through the emission control line EMLj. In this way, the first driving voltage ELVDD may be compensated through the first transistor T1 thus diode-connected and may be supplied to the light emitting element ED.

The seventh transistor T7 includes a first electrode connected to the anode of the light emitting element ED, a second electrode connected to the voltage line AVL, and a gate electrode connected to the scan line GWLj+1. The seventh transistor T7 is turned on depending on the scan signal GWj+1 received through the scan line GWLj+1, and bypasses a current of the anode of the light emitting element ED to the voltage line AVL.

As described above, one end of the capacitor Cst is connected to the gate electrode of the first transistor T1, and the other end of the capacitor Cst is connected to the first driving voltage line VL1. The cathode of the light emitting element ED may be connected to the second driving voltage line VL2 that delivers the second driving voltage ELVSS. A structure of the pixel PXij according to an embodiment is not limited to the structure shown in FIG. 5. The number of transistors included in the one pixel PXij, the number of capacitors included in the one pixel PXij, and the connection relationship thereof may be variously modified.

Figure 6:
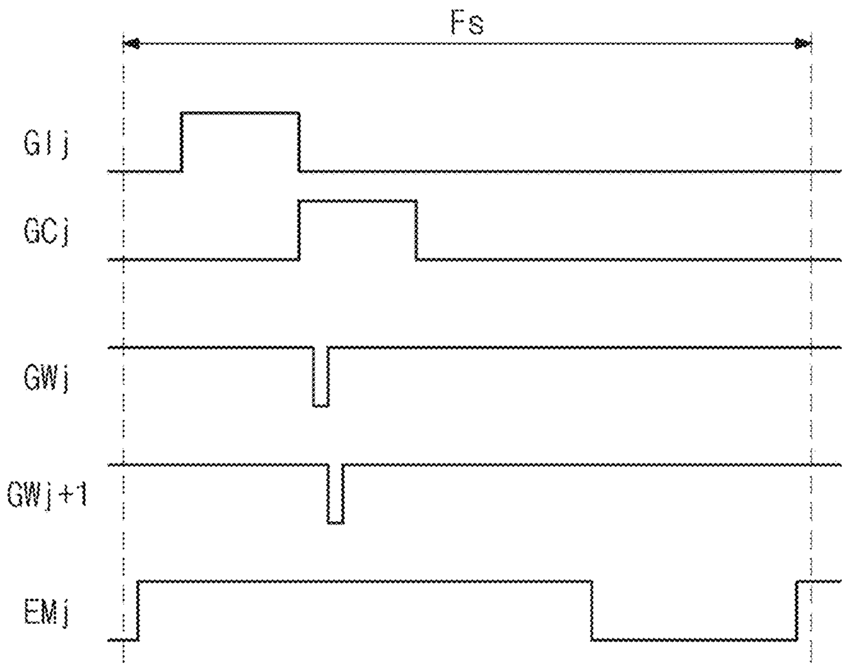
FIG. 6 is a timing diagram for describing an operation of a pixel illustrated in FIG. 5.

FIG. 6 is a timing diagram for describing an operation of a pixel illustrated in FIG. 5.

Hereinafter, an operation of a display device according to an embodiment will be described with reference to FIGS. 5 and 6.

Referring to FIGS. 5 and 6, the scan signal GIj having a high level is provided through the scan line GILj during an initialization interval within one frame Fs. When the fourth transistor T4 is turned on in response to the scan signal GIj having a high level, the initialization voltage VINT is supplied to the gate electrode of the first transistor T1 through the fourth transistor T4 so as to initialize the first transistor T1.

Next, when the scan signal GCj having a high level is supplied through the scan line GCLj during data programming and compensation interval, the third transistor T3 is turned on. The first transistor T1 is diode-connected by the third transistor T3 thus turned on and is forward-biased. At this time, when the scan signal GWj having a low level is supplied through the scan line GWLj, the second transistor T2 is turned on. In the case, a compensation voltage, which is obtained by reducing the voltage of the data signal Di supplied from the data line DLi by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are applied to opposite ends of the capacitor Cst, respectively, a charge corresponding to a difference between the first driving voltage ELVDD and the compensation voltage may be stored in the capacitor Cst.

In the meantime, the seventh transistor T7 is turned on in response to the scan signal GWj+1 having a low level that is delivered through the scan line GWLj+1. A part of the driving current Id may be drained through the seventh transistor T7 as a bypass current Ibp.

When the light emitting element ED emits light under the condition that a minimum current of the first transistor T1 flows as a driving current Id for the purpose of displaying a black image, the black image may not be normally displayed. Accordingly, the seventh transistor T7 in the pixel PXij according to an embodiment of the present disclosure may drain (or disperse) a part of the minimum current of the first transistor T1 to a current path, which is different from a current path to the light emitting element ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current Id (e.g., a current of 10 picoamperes (pA) or less) is delivered to the light emitting element ED, with the first transistor T1 turned off, an image of black luminance is expressed. When the minimum driving current Id for displaying a black image flows, the influence of a bypass transfer of the bypass current Ibp may be great; on the other hand, when a large driving current Id for displaying an image such as a normal image or a white image flows, there may be almost no influence of the bypass current Ibp. Accordingly, when a driving current Id for displaying a black image flows, a light emitting current led of the light emitting element ED, which corresponds to a result of subtracting the bypass current Ibp drained through the seventh transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GWj+1 having a low level, but is not necessarily limited thereto.

The bypass current Ibp flowing from the anode of the light emitting element ED to the voltage line AVL may be adjusted depending on the voltage level of the anode initialization voltage VAINT provided through the voltage line AVL.

Next, during a light emitting interval, the emission control signal EMj supplied from the emission control line EMLj is changed from a high level to a low level. During a light emitting interval, the fifth transistor T5 and the sixth transistor T6 are turned on by the emission control signal EMj having a low level. In this case, the driving current Id is generated depending on a voltage difference between the gate voltage of the gate electrode of the first transistor T1 and the first driving voltage ELVDD and is supplied to the light emitting element ED through the sixth transistor T6, and the light emitting current Ted flows through the light emitting element ED.

Figure 7:
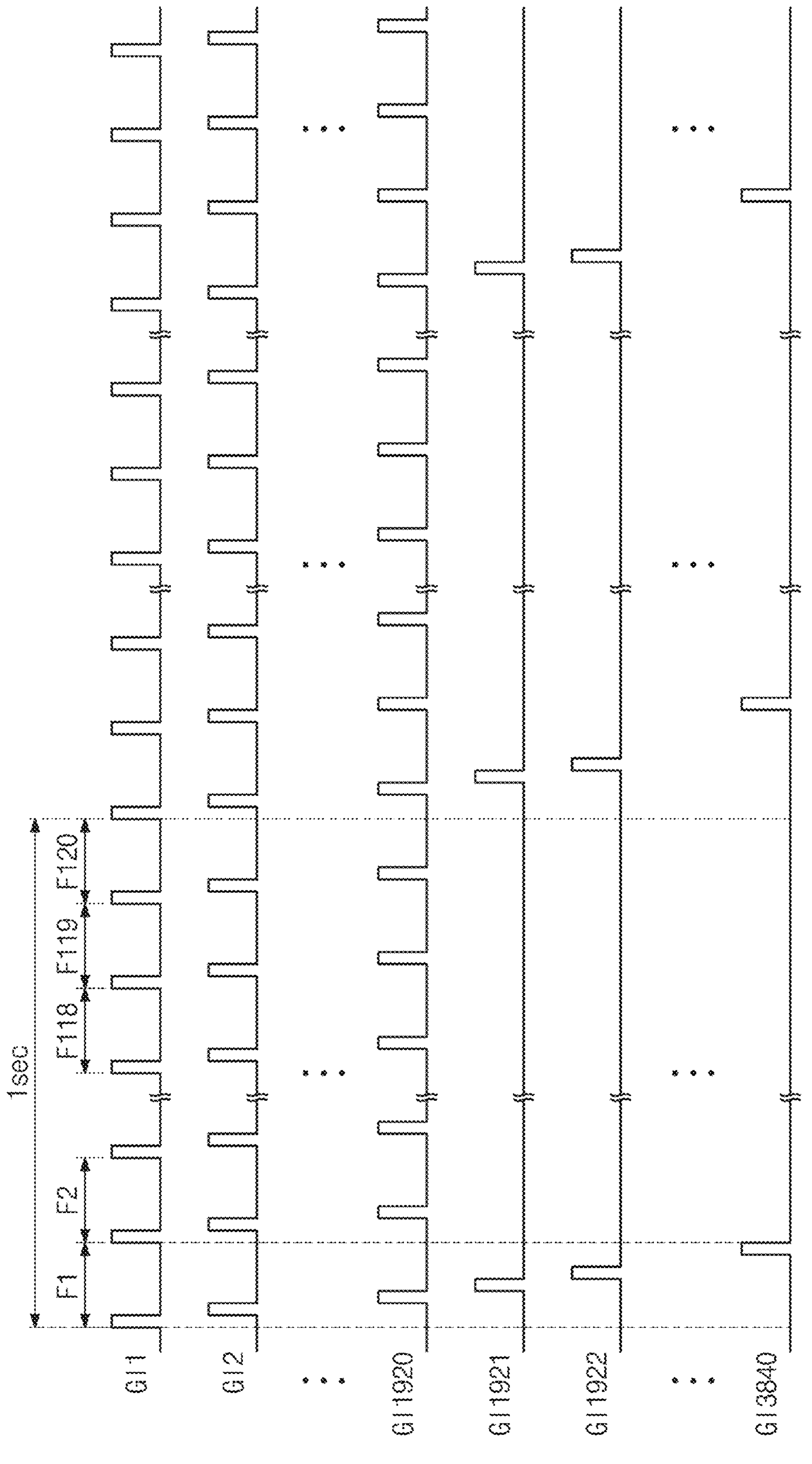
FIG. 7 illustrates scan signals in a multi-frequency mode.

FIG. 7 illustrates scan signals GI1 to GI3840 in a multi-frequency mode.

Referring to FIGS. 1 and 7, in an embodiment, the scan signals Gil to GI1920 correspond to the first display area DA1 of the display device DD. The scan signals GI1921 to GI3840 correspond to the second display area DA2 of the display device DD.

In a multi-frequency mode, the frequency of each of the scan signals Gil to GI1920 is 120 Hz, and the frequency of each of the scan signals GI1921 to GI3840 may be 1 Hz.

The scan signals Gil to GI1920 may be activated at a high level in each of the first to 120th frames F1 to F120. The scan signals GI1921 to GI3840 may be activated at a high level only in the first frame F1.

Accordingly, the first display area DA1 in which a video is displayed may be driven in response to the scan signals Gil to GI1920 having a normal frequency (e.g., 120 Hz). The second display area DA2 where a still image is displayed may be driven in response to the scan signals GI1921 to GI3840 having a low frequency (e.g., 1 Hz). Only the second display area DA2, where the still image is displayed, is driven at a low frequency, thereby reducing power consumption while deterioration of the display quality of the display device DD (see FIG. 1) is minimized.

FIG. 7 illustrates only the scan signals GI1 to GI3840. However, similarly to the scan signals GI1 to GI3840, the scan driving circuit SD (see FIG. 4) and the emission driving circuit EDC (see FIG. 4) may generate scan signals GC1 to GC3840 and GW1 to GW3841 and emission control signals EM1 to EM3840.

Figure 8:
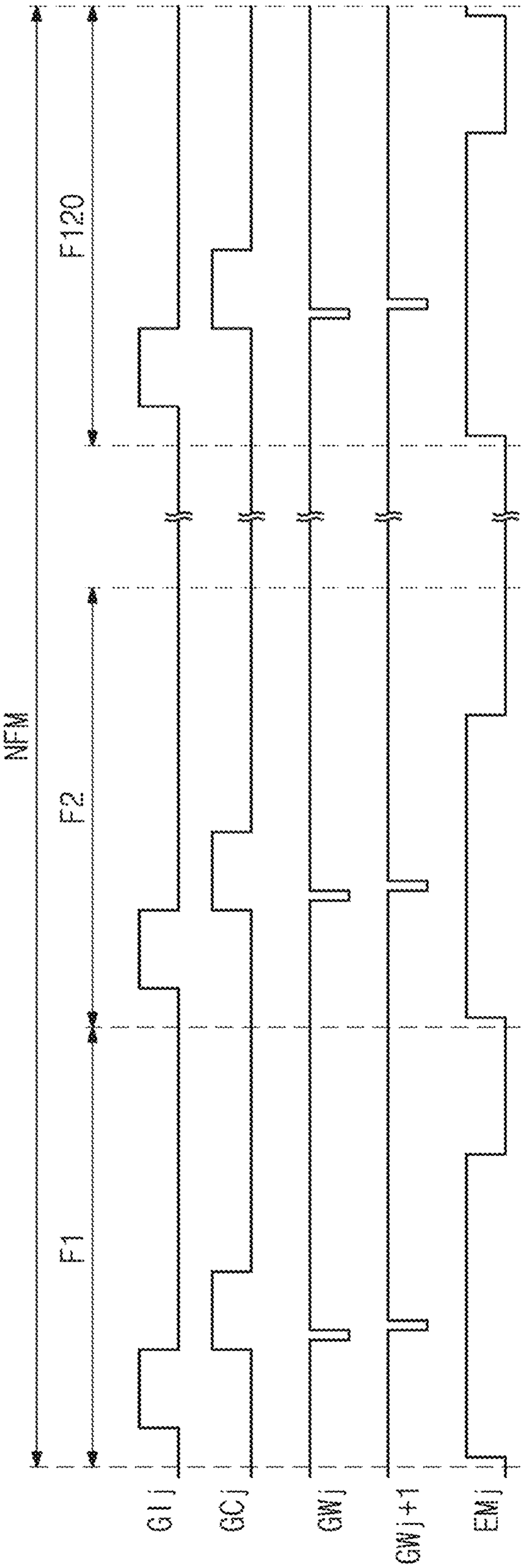
FIG. 8 illustrates scan signals and an emission control signal, which are provided to a j-th row, when a pixel in a j-th row is driven at a first operating frequency identical to a normal frequency.

FIG. 8 illustrates scan signals and an emission control signal, which are provided to a j-th row, when a pixel in a j-th row is driven at a first operating frequency identical to a normal frequency.

Referring to FIG. 8, when a pixel in the j-th row is driven at the first operating frequency identical to the normal frequency in the single frequency mode NFM, the scan signals GIj, GCj, GWj, and GWj+1 and the emission control signal EMj transition to an active level in each of the first to 120th frames F1 to F120. In an embodiment, in the case of the scan signals GIj and GCj, a high level is an active level. In the case of the scan signals GWj and GWj+1 and the emission control signal EMj, a low level is an active level.

Figure 9:
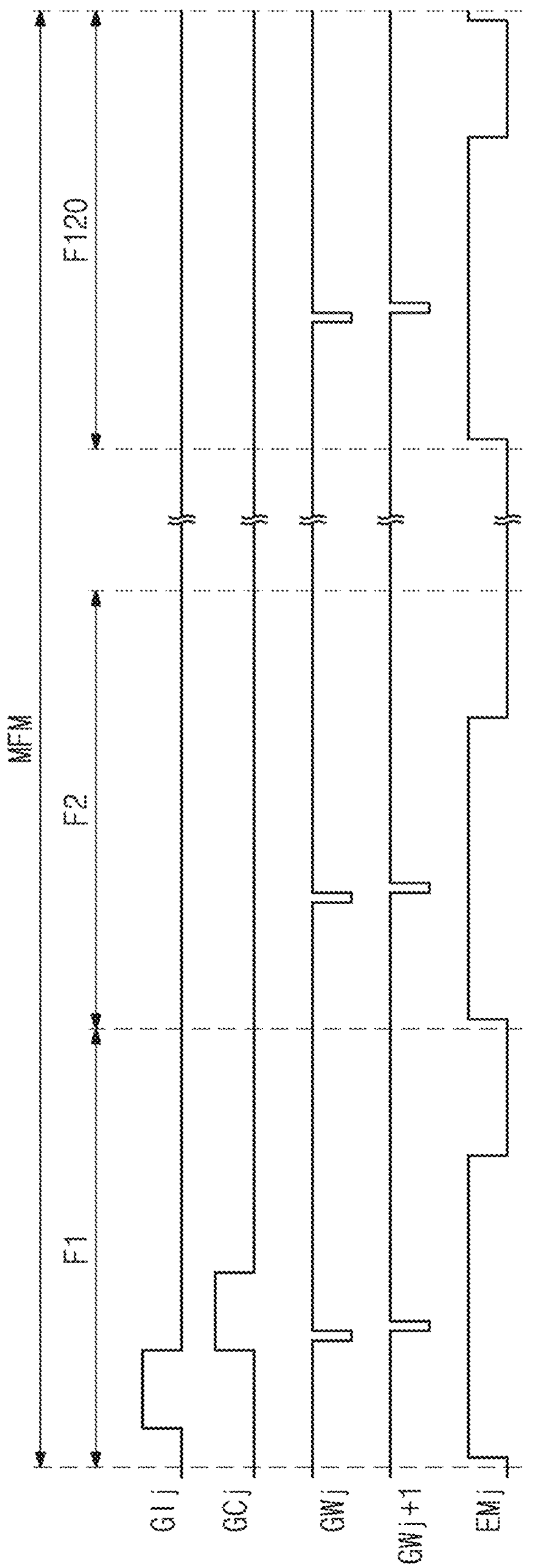
FIG. 9 illustrates scan signals and an emission control signal, which are provided to a j-th row, when a pixel in a j-th row is driven at a second operating frequency lower than a normal frequency.

FIG. 9 illustrates scan signals and an emission control signal, which are provided to a j-th row, when a pixel in a j-th row is driven at a second operating frequency lower than a normal frequency.

Referring to FIG. 9, when the j-th row pixel is driven at a second operating frequency (e.g., 1 Hz) lower than a normal frequency in the multi-frequency mode MFM, the scan signals GIj, GCj, GWj, and GWj+1 and the emission control signal EMj transition to an active level in the first frame F1. In an embodiment, in the case of the scan signals GIj and GCj, a high level is an active level. In the case of the scan signals GWj and GWj+1 and the emission control signal EMj, a low level is an active level.

In each of the second to 120th frames F2 to F120, the scan signals GIj and GCj are maintained at a low level, which is an inactive level, and the scan signals GWj and GWj+1 and the emission control signal EMj transition to an active level.

Returning to FIG. 5, a parasitic capacitance Cp may be present between the anode of the light emitting element ED and the scan line GILj.

As illustrated in FIG. 8, as the scan signal GIj transitions from a low level to a high level, and then again transitions from a high level to a low level in each of the first to 120th frames F1 to F120, a voltage level of the anode of the light emitting element ED may be changed due to the parasitic capacitance Cp. A change in a voltage level of the anode of the light emitting element ED leads to a change in the luminance of the light emitting element ED.

As illustrated in FIG. 9, when the scan signal GIj is maintained at a low level in each of the second to 120th frames F2 to F120, there is little change in the voltage level of the anode of the light emitting element ED due to the parasitic capacitance Cp.

When all the pixels PX of the display panel DP illustrated in FIG. 4 are driven at the same operating frequency, the change in luminance of the light emitting element ED due to the parasitic capacitance Cp may not be visually perceived by a user.

However, when the pixels PX in the first display area DA1 is driven at the first operating frequency and the pixels PX in the second display area DA2 is driven at the second operating frequency, a luminance difference between the first display area DA1 and the second display area DA2 due to the parasitic capacitance Cp may be visually perceived by the user.

Figure 10:
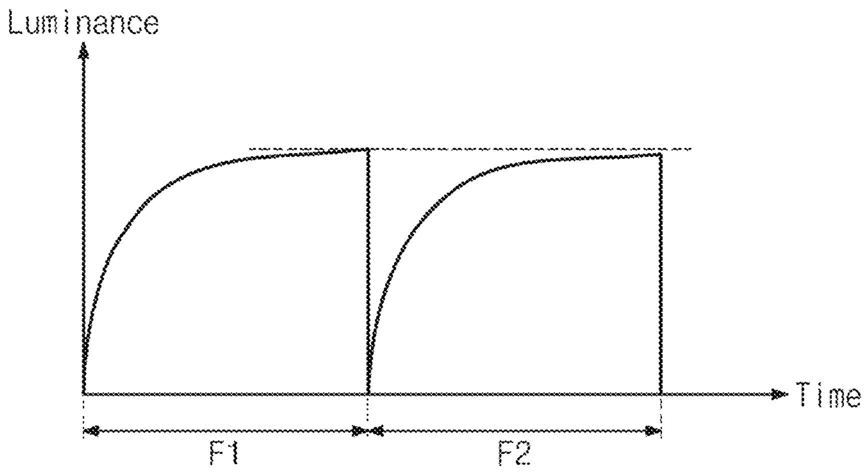
FIG. 10 illustrates a luminance change of a first display area in a first frame and a second frame when the first display area is driven at a first operating frequency identical to a normal frequency.

FIG. 10 illustrates a luminance change of a first display area in a first frame and a second frame when the first display area is driven at a first operating frequency identical to a normal frequency.

Figure 11:
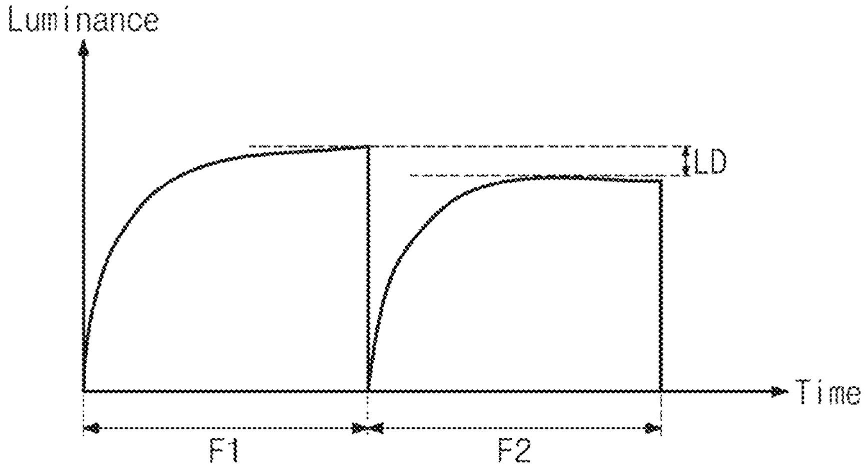
FIG. 11 illustrates a luminance change of a second display area in a first frame and a second frame when the second display area is driven at a second operating frequency lower than a normal frequency.

FIG. 11 illustrates a luminance change of a second display area in a first frame and a second frame when the second display area is driven at a second operating frequency lower than a normal frequency.

As described in FIGS. 9 and 10, when the first display area DA1 is driven at a first operating frequency identical to a normal frequency, there is little change in luminance of the first display area DA1 between the first frame F1 and the second frame F2.

However, when the second display area DA2 is driven at a second operating frequency lower than the normal frequency, the luminance of the second display area DA2 may be different in the first frame F1 and the second frame F2. A luminance difference LD may be visually perceived by a user.

In particular, as illustrated in FIGS. 8 and 9, when the first display area DA1 is driven at 120 Hz and the second display area DA2 is driven at 1 Hz, the scan signal GIj is maintained at a low level in the second to 120th frames F2 to F120, and thus a difference in luminance between the first display area DA1 and the second display area DA2 may be visually perceived by the user.

Figure 12:
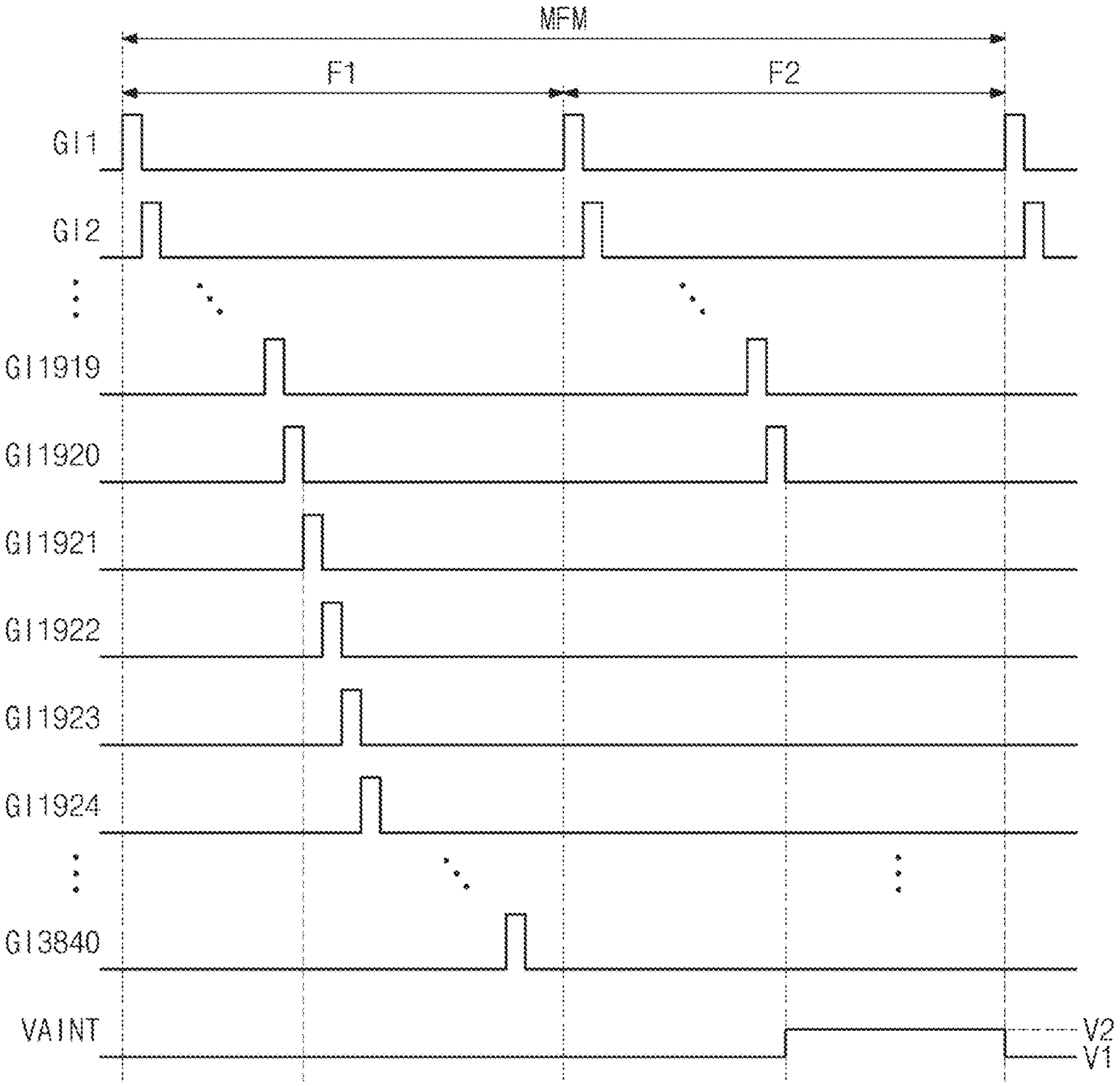
FIG. 12 is a diagram illustrating scan signals and an anode initialization voltage in a multi-frequency mode.
Figure 13:
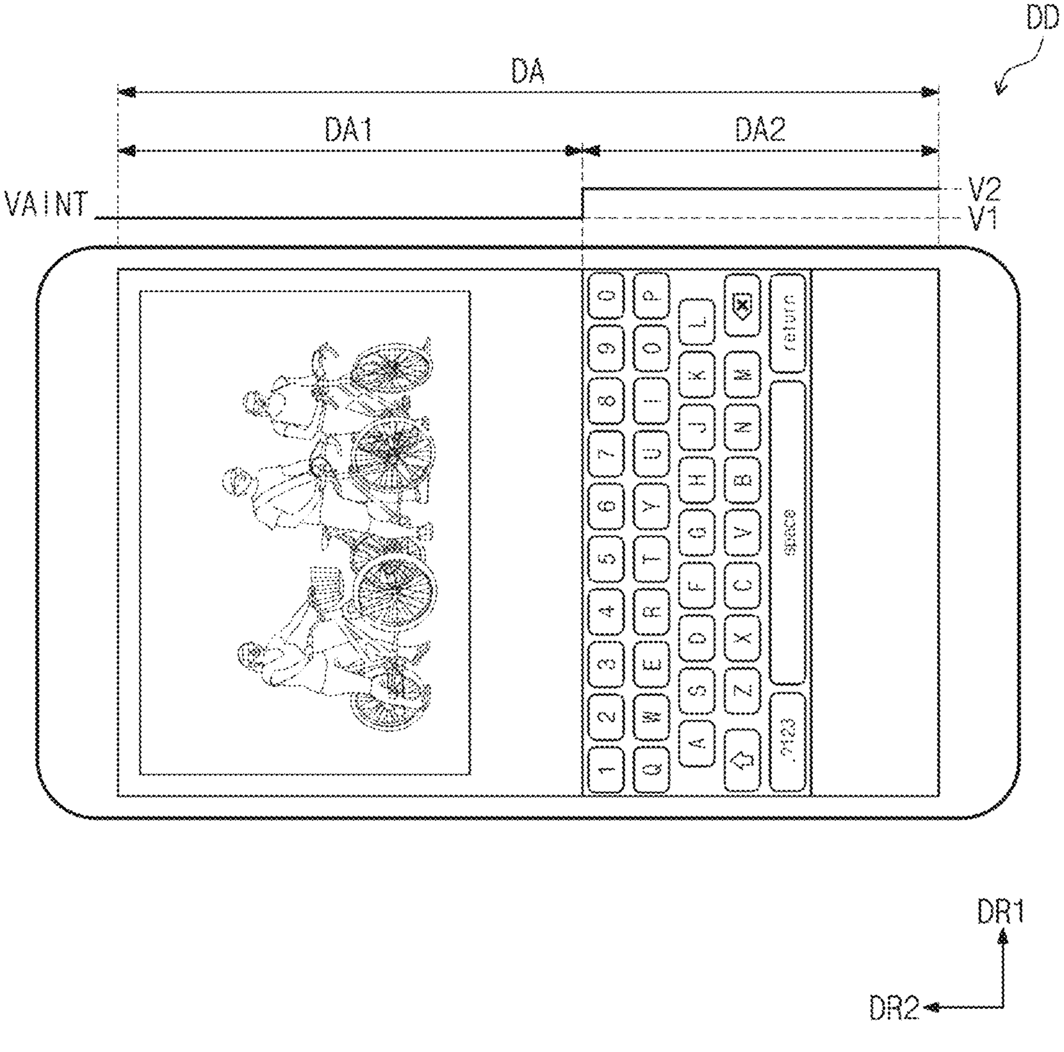
FIG. 13 is a diagram conceptually illustrating a change in an anode initialization voltage according to a first display area and a second display area of a display device.

FIG. 12 is an embodiment of a diagram illustrating scan signals and an anode initialization voltage in a multi-frequency mode. FIG. 13 is a diagram conceptually illustrating a change in an anode initialization voltage according to a first display area and a second display area of a display device of FIG. 12.

Referring to FIGS. 12 and 13, during the first frame F1 of the multi-frequency mode MFM, the scan signals GI1 to GI3840 may sequentially transition to a high level. During the second frame F2 of the multi-frequency mode MFM, the scan signals GI1 to GI1920 corresponding to the first display area DA1 may sequentially transition to a high level, and the scan signals GI1921 to GI3840 corresponding to the second display area DA2 may be maintained at a low level.

In an embodiment, during the first frame F1, the anode initialization voltage VAINT provided to the voltage line AVL illustrated in FIG. 5 is maintained at a first voltage level V1.

While the scan signals GI1 to GI1920 sequentially transition to a high level during the second frame F2, the anode initialization voltage VAINT is maintained at the first voltage level V1. While the scan signals GI1921 to GI3840 are maintained at a low level, the anode initialization voltage VAINT is maintained at a second voltage level V2. In an embodiment, the second voltage level V2 may be a higher voltage level than the first voltage level V1. For example, the first voltage level V1 may be −3.5 volts (V), and the second voltage level V2 may be −3 V.

As illustrated in FIGS. 4 and 11, in the second frame F2 of the multi-frequency mode MFM, the luminance difference LD between the first display area DA1 and the second display area DA2 of the display panel DP is generated because the voltage level of the anode of the light emitting element ED is changed based on whether the parasitic capacitance Cp is present.

Accordingly, in the same manner as when the scan signals GI1 to GI1920 transition to a high level, the voltage level of the anode of the light emitting element ED may be changed by increasing the voltage level of the anode initialization voltage VAINT while the scan signals GI1921 to GI3840 are maintained at a low level. Accordingly, the luminance difference LD between the first display area DA1 and the second display area DA2 of the display panel DP may be effectively minimized.

Figure 14:
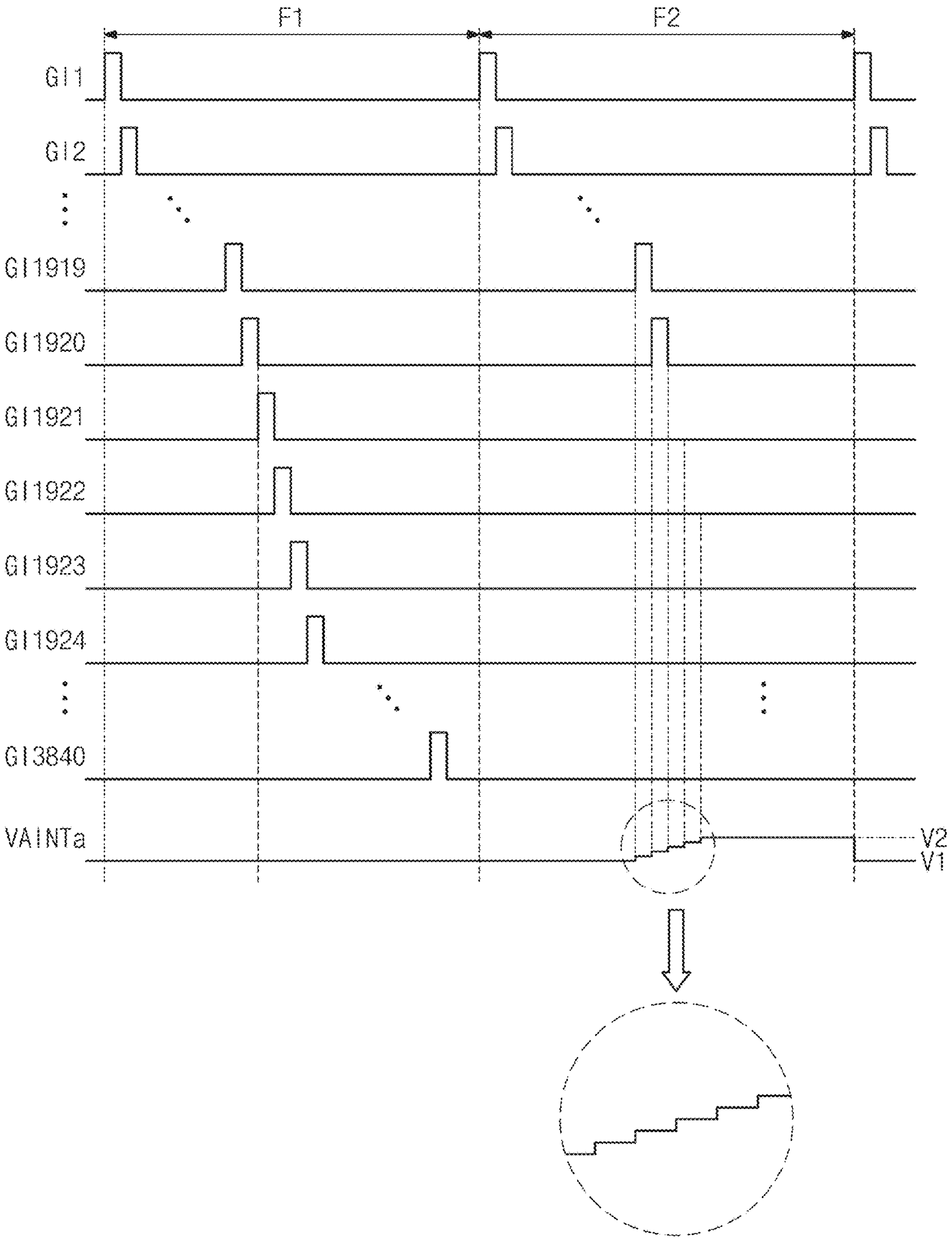
FIG. 14 is a diagram illustrating scan signals and an anode initialization voltage in a multi-frequency mode.
Figure 15:
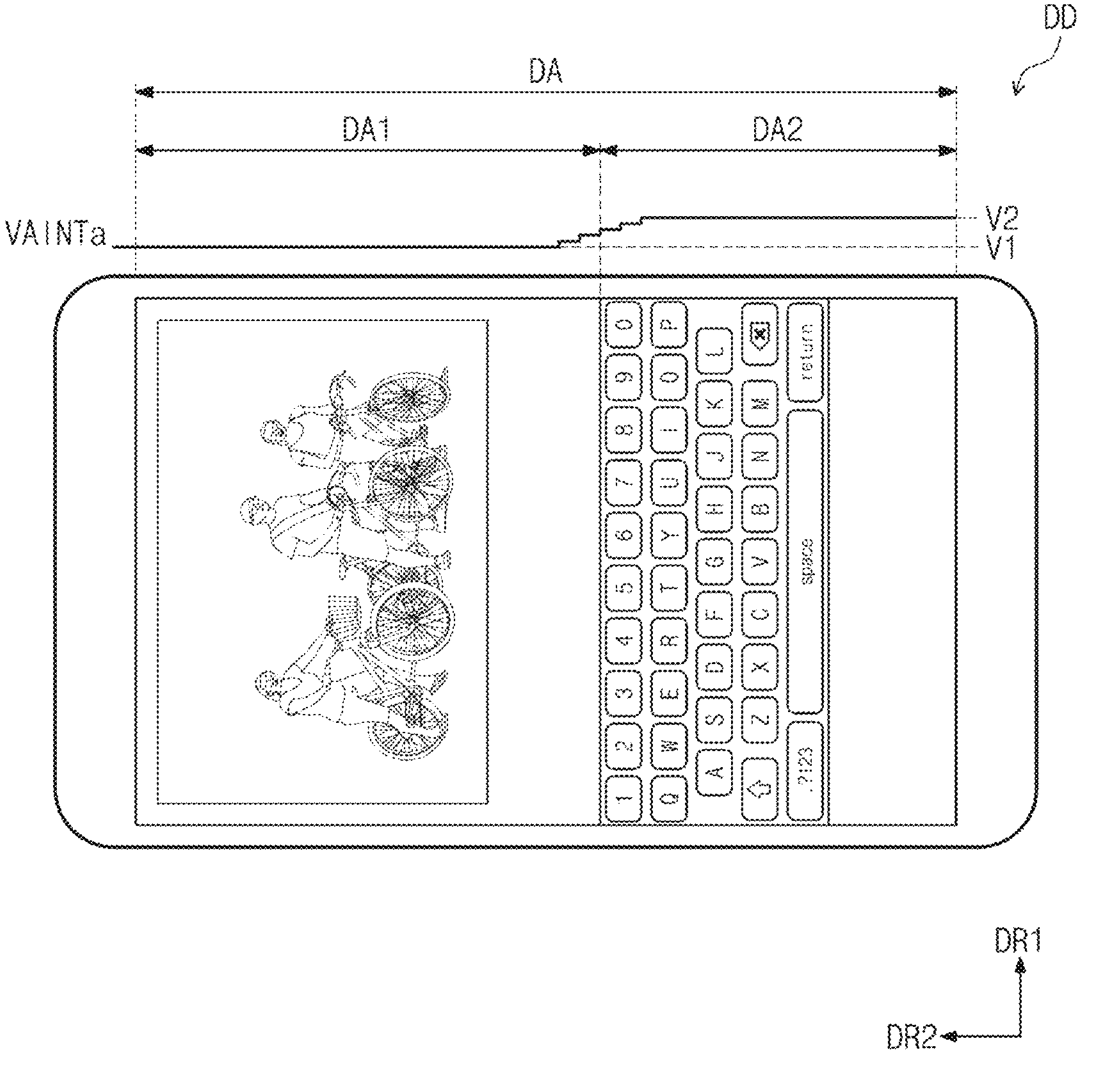
FIG. 15 is a diagram conceptually illustrating a change in an anode initialization voltage according to a first display area and a second display area of a display device.

FIG. 14 is another embodiment of a diagram illustrating scan signals and an anode initialization voltage in a multi-frequency mode. FIG. 15 is a diagram conceptually illustrating a change in an anode initialization voltage according to a first display area and a second display area of a display device of FIG. 14.

Referring to FIGS. 14 and 15, during the first frame F1 of the multi-frequency mode MFM, the scan signals GI1 to GI3840 may sequentially transition to a high level. During the second frame F2 of the multi-frequency mode MFM, the scan signals GI1 to GI1920 corresponding to the first display area DA1 may sequentially transition to a high level, and the scan signals GI1921 to GI3840 corresponding to the second display area DA2 may be maintained at a low level.

In an embodiment, while the scan signals GI1 to GI1918 corresponding to the first display area DA1 sequentially transition to a high level, the anode initialization voltage VAINTa provided to the voltage line AVL shown in FIG. 5 is maintained at the first voltage level V1.

While some scan signals GI1919 and GI1920 corresponding to the first display area DA1 and some scan signals GI1921 and GI1922 corresponding to the second display area DA2 are driven, the anode initialization voltage VAINTa increases step by step from the first voltage level V1 to the second voltage level V2.

That is, while the scan signals GI1919 and GI1920 corresponding to a part of the first display area DA1 adjacent to the second display area DA2 and the scan signals GI1921 and GI1922 corresponding to a part of the second display area DA2 adjacent to the first display area DA1 are driven, the anode initialization voltage VAINTa is changed step by step from the first voltage level V1 to the second voltage level V2.

While the scan signals GI1923 to GI3840 corresponding to the second display area DA2 are maintained at a low level, the anode initialization voltage VAINTa is maintained at the second voltage level V2. In an embodiment, the second voltage level V2 may be a higher voltage level than the first voltage level V1.

A sharp luminance difference in the boundary area between the first display area DA1 and the second display area DA2 may be reduced as the voltage level of the anode initialization voltage VAINTa is changed step by step from the first voltage level V1 to the second voltage level V2 in the boundary area where the first display area DA1 and the second display area DA2 are met.

In the example shown in FIGS. 12 to 15, the second voltage level V2 is described as being higher than the first voltage level V1 as an example, but the present disclosure is not limited thereto. In another embodiment, when the second display area DA2 is driven at a second operating frequency lower than the normal frequency, the second voltage level V2 of the anode initialization voltage VAINTa may be lower than the first voltage level V1.

Figure 16A:
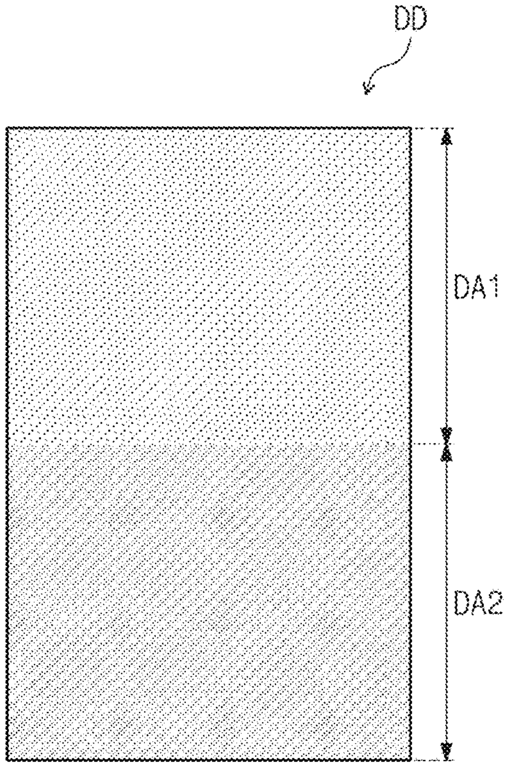
FIG. 16A illustrates an image displayed in a first display area and a second display area when an anode initialization voltage having the same voltage level is provided to a first display area and a second display area of a display device.

FIG. 16A illustrates an image displayed in a first display area and a second display area when an anode initialization voltage having the same voltage level is provided to a first display area and a second display area of a display device.

When the anode initialization voltage VAINT (see FIG. 5) having the same voltage level is provided to the first display area DA1 and the second display area DA2 of the display device DD, even though the same image signal is provided to the first display area DA1 and the second display area DA2, images displayed in the first display area DA1 and the second display area DA2 may be displayed with different luminance or color.

Figure 16B:
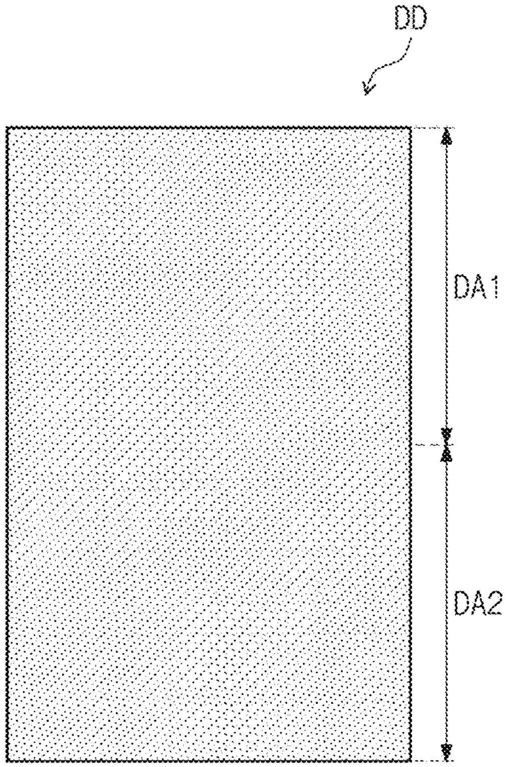
FIG. 16B illustrates an image displayed in a first display area and a second display area when anode initialization voltages having different voltage levels are provided to a first display area and a second display area of a display device, respectively.

FIG. 16B illustrates an image displayed in a first display area and a second display area when anode initialization voltages having different voltage levels are provided to a first display area and a second display area of a display device, respectively.

In the case where the anode initialization voltage VAINT having a first voltage level is provided to the first display area DA1 of the display device DD, and the anode initialization voltage VAINT having a second voltage level different from the first voltage level is provided to the second display area DA2, when the same image signal is provided to the first display area DA1 and the second display area DA2, an image displayed in the first display area DA1 and the second display area DA2 may have the same luminance and color.

Figure 17:
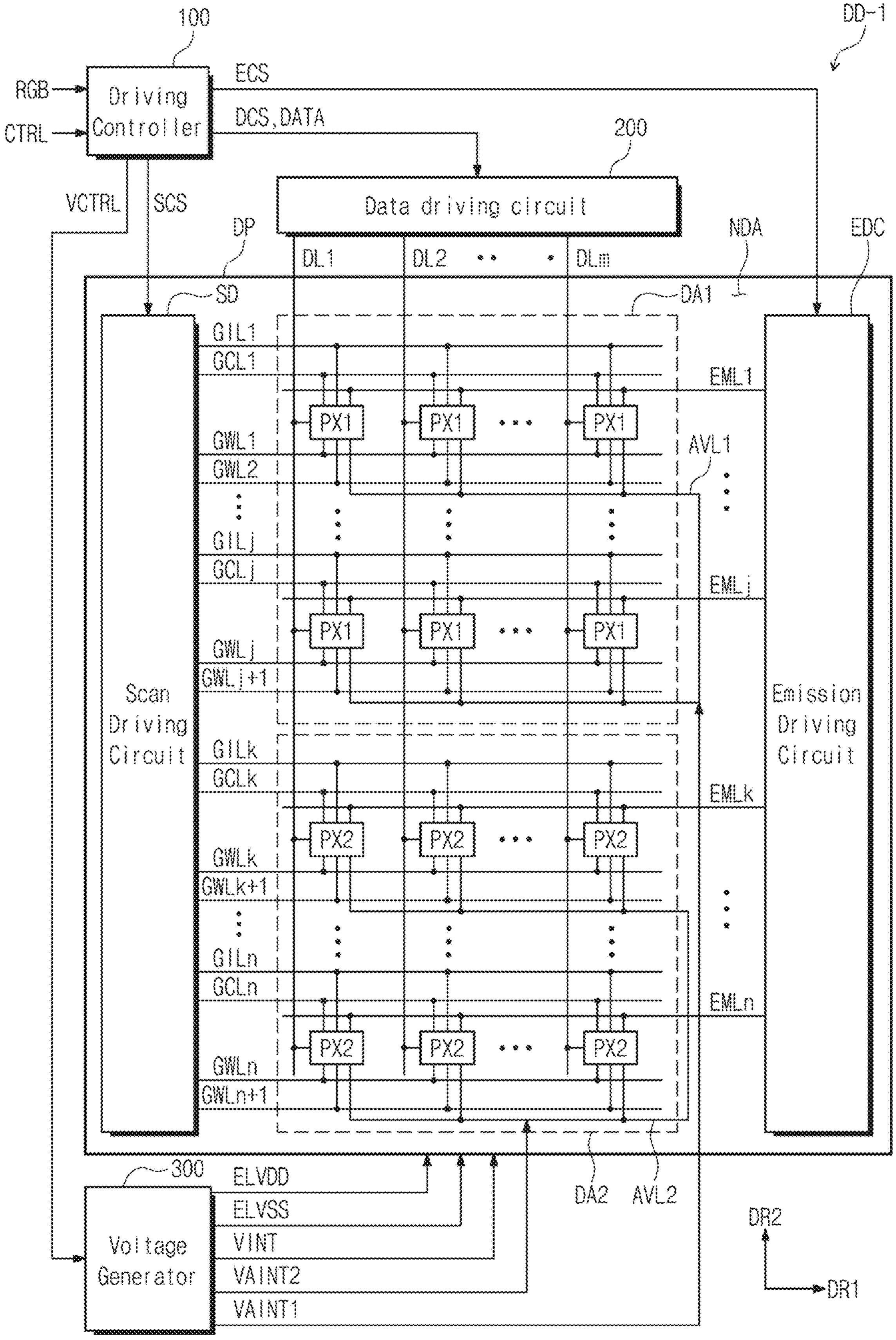
FIG. 17 is a block diagram of a display device, according to another embodiment of the present disclosure.

FIG. 17 is a block diagram of a display device, according to another embodiment of the present disclosure.

Referring to FIG. 17, a display device DD-1 includes the display panel DP, the driving controller 100, the data driving circuit 200, and the voltage generator 300.

The display device DD-1 shown in FIG. 17 has a configuration similar to the display device DD shown in FIG. 4. The same reference numerals are used for the same components, and additional descriptions are omitted to avoid redundancy.

The display panel DP may be divided into the first display area DA1 and the second display area DA2. First pixels PX1 arranged from a first row to a j-th row may correspond to the first display area DA1. Second pixels PX2 arranged from a k-th row to an n-th row may correspond to the second display area DA2. Herein, each of 'J', 'k', and 'n' may be a natural number and may be "k=j+1".

The first pixels PX1 are electrically connected to the scan lines GIL1 to GILj, GCL1 to GCLj, and GWL1 to GWLj+1, the emission control lines EML1 to EMLj, and the data lines DL1 to DLm. Each of the first pixels PX1 may be electrically connected to four scan lines and one emission control line. For example, as shown in FIG. 17, pixels in a first row may be connected to the scan lines GIL1, GCL1, GWL1, and GWL2 and the emission control line EML1. Furthermore, pixels in the j-th row may be connected to the scan lines GILj, GCLj, GWLj, and GWLj+1 and the emission control line EMLj.

The second pixels PX2 are electrically connected to the scan lines GILk to GILn, GCLk to GCLn, GWLk to GWLn+1, the emission control lines EMLk to EMLn, and the data lines DL1 to DLm. Each of the plurality of second pixels PX2 may be electrically connected to four scan lines and one emission control line. For example, as illustrated in FIG. 17, pixels in the k-th row may be connected to the scan lines GILk, GCLk, GWLk, and GWLk+1 and the emission control line EMLk. Also, pixels in the n-th row may be connected to the scan lines GILn, GCLn, GWLn, and GWLn+1 and the emission control line EMLn.

In an embodiment, the first pixels PX1 may be electrically connected to a first voltage line AVL1. The second pixels PX2 may be electrically connected to a second voltage line AVL2.

The voltage generator 300 generates the first driving voltage ELVDD, the second driving voltage ELVSS, the initialization voltage VINT, a first anode initialization voltage VAINT1, and a second anode initialization voltage VAINT2.

The first anode initialization voltage VAINT1 may be provided to the first pixels PX1 through the first voltage line AVL1. The second anode initialization voltage VAINT2 may be provided to the second pixels PX2 through the second voltage line AVL2.

The driving controller 100 outputs the voltage control signal VCTRL for setting a voltage level of each of the first anode initialization voltage VAINT1 and the second anode initialization voltage VAINT2.

The voltage generator 300 may change the voltage level of each of the first anode initialization voltage VAINT1 and the second anode initialization voltage VAINT2 in response to the voltage control signal VCTRL.

Figure 18:
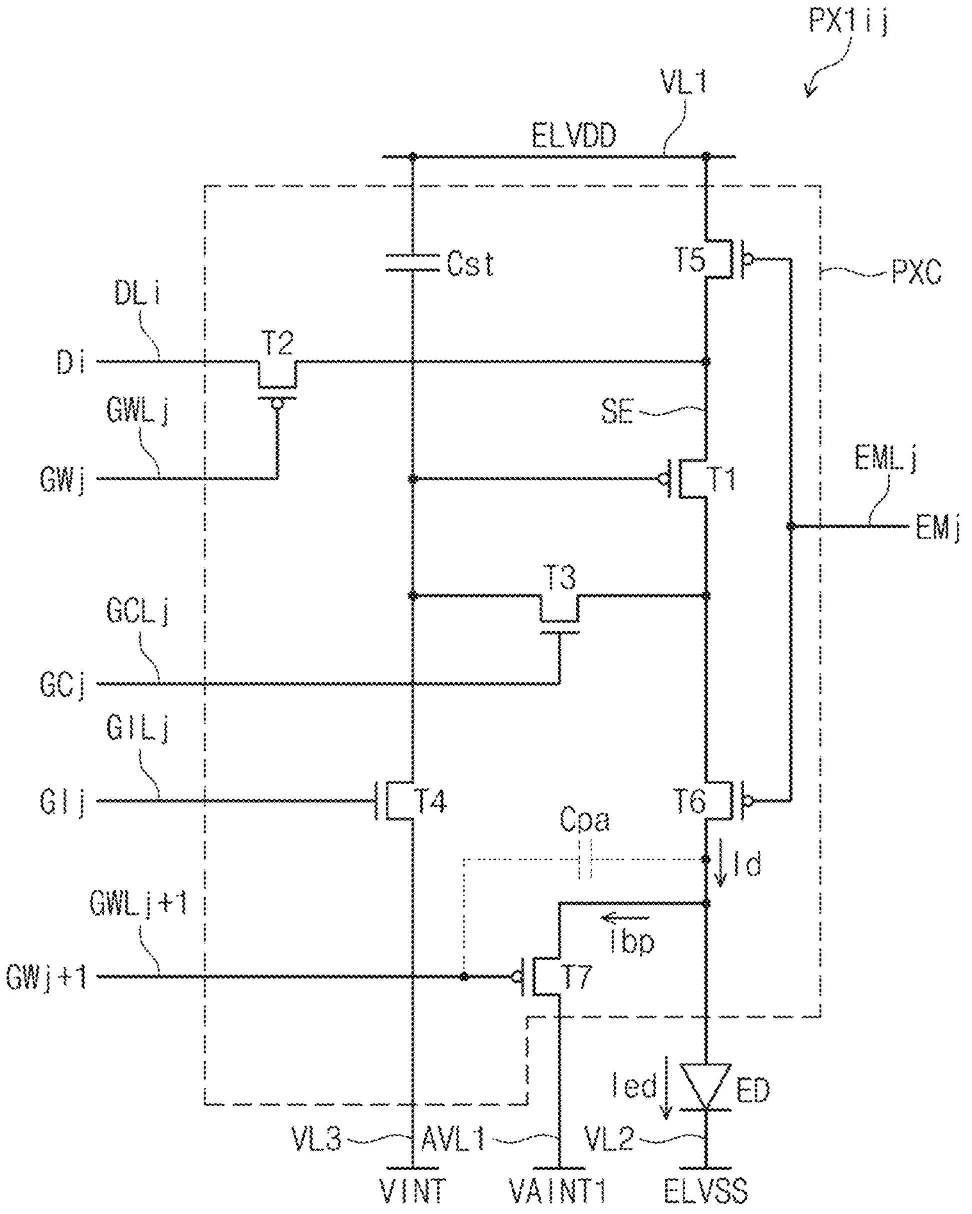
FIG. 18 is an equivalent circuit diagram of a pixel according to another embodiment of the present disclosure.

FIG. 18 is an equivalent circuit diagram of a pixel according to another embodiment of the present disclosure.

FIG. 18 illustrates an equivalent circuit diagram of a first pixel PX1*ij* connected to the i-th data line DLi among the data lines DL1 to DLm, the j-th scan lines GILj, GCLj, and GWLj and the (j+1)-th scan line GWLj+1 among the scan lines GIL1 to GILj, GCL1 to GCLj, and GWL1 to GWLj+1, and the j-th emission control line EMLj among the emission control lines EML1 to EMLj, which are illustrated in FIG. 17.

The first pixel PX1*ij* includes a circuit configuration similar to the pixel PXij shown in FIG. 5. The same reference numerals are used for the same components, and additional descriptions are omitted to avoid redundancy.

The seventh transistor T7 includes a first electrode connected to the anode of the light emitting element ED, a second electrode connected to the first voltage line AVL1, and a gate electrode connected to the scan line GWLj+1. The seventh transistor T7 is turned on depending on the scan signal GWj+1 received through the scan line GWLj+1, and bypasses a current Ibp of the anode of the light emitting element ED to the first voltage line AVL1.

Figure 19:
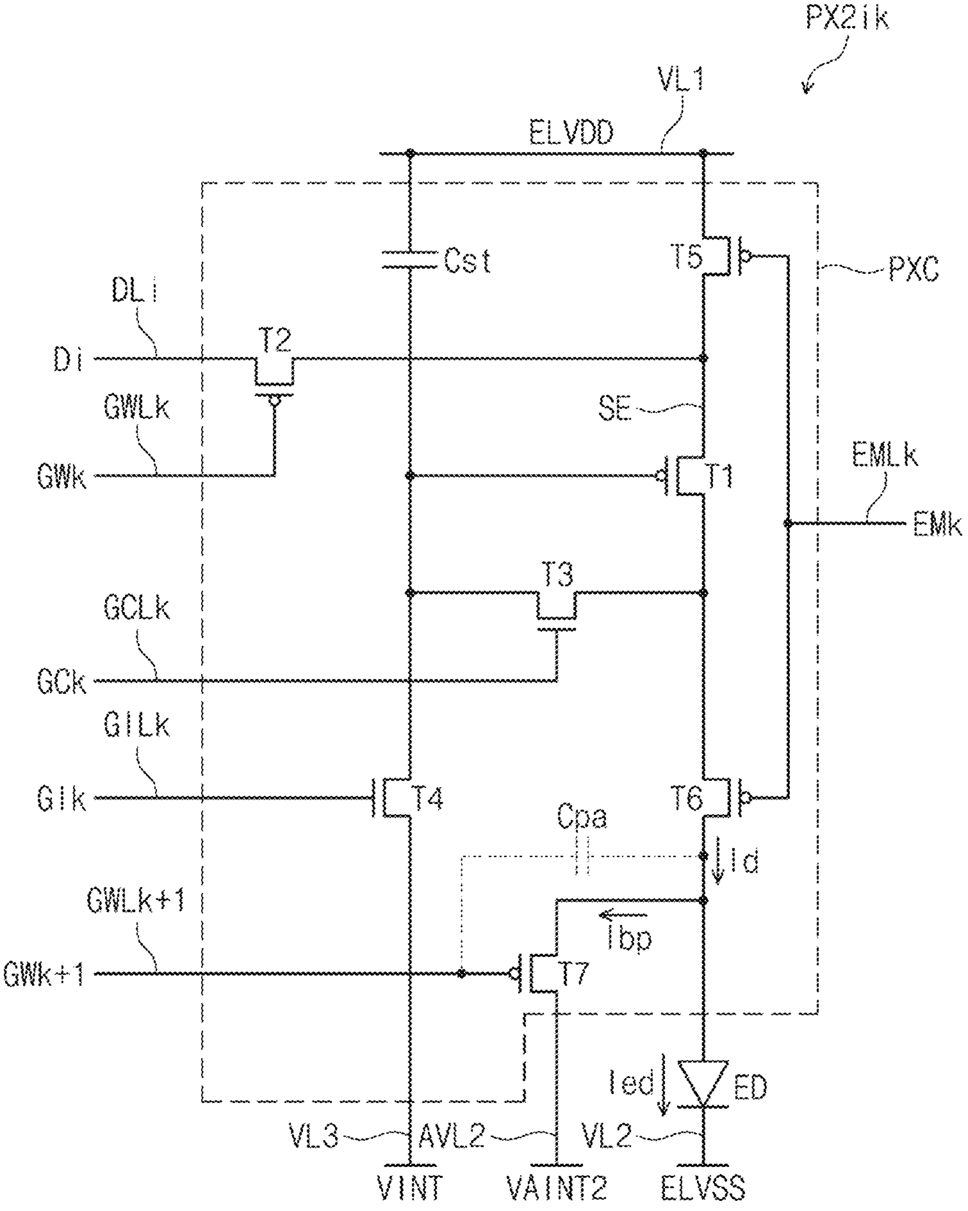
FIG. 19 is an equivalent circuit diagram of a pixel, according to still another embodiment of the present disclosure.

FIG. 19 is an equivalent circuit diagram of a pixel, according to still another embodiment of the present disclosure.

FIG. 19 illustrates an equivalent circuit diagram of a second pixel PX2*ik* connected to the i-th data line DLi among the data lines DL1 to DLm, the k-th scan lines GILk, GCLk, and GWLk and the (k+1)-th scan line GWLk+1 among the scan lines GILk to GILn, GCLk to GCLn, and GWLk to GWLn+1, and the k-th emission control line EMLk among the emission control lines EMLk to EMLn, which are illustrated in FIG. 17.

The second pixel PX2*ik* includes a circuit configuration similar to the pixel PXij shown in FIG. 5. The same reference numerals are used for the same components, and additional descriptions are omitted to avoid redundancy.

The seventh transistor T7 includes a first electrode connected to the anode of the light emitting element ED, a second electrode connected to the second voltage line AVL2, and a gate electrode connected to the scan line GWLk+1. The seventh transistor T7 is turned on depending on the scan signal GWk+1 received through the scan line GWLk+1, and bypasses a current Ibp of the anode of the light emitting element ED to the second voltage line AVL2.

Figure 20:
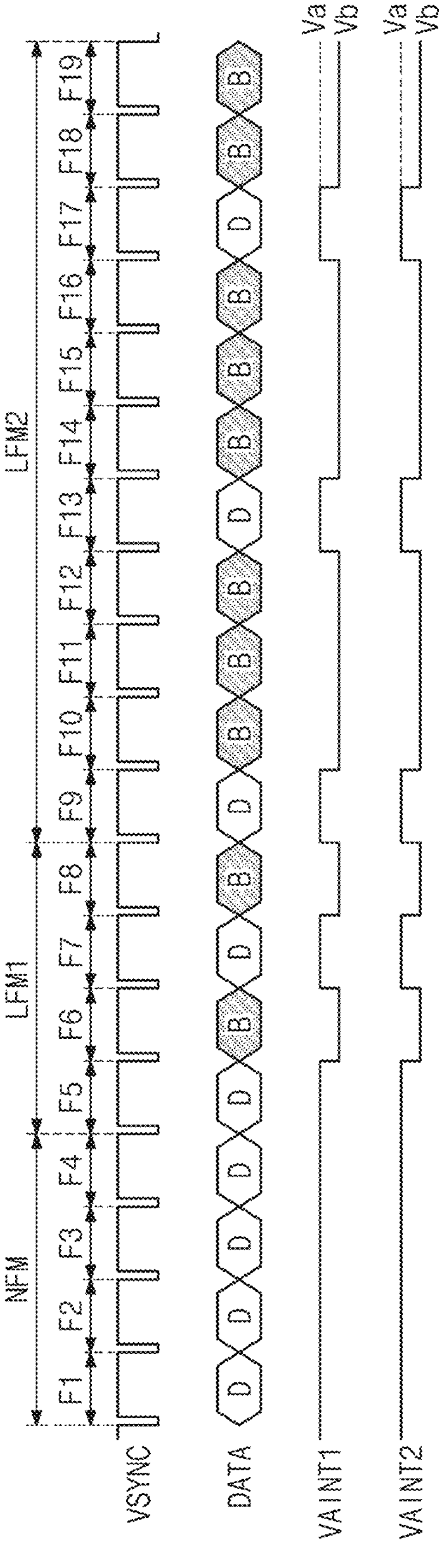
FIG. 20 illustrates changes in a first anode initialization voltage and a second anode initialization voltage in a single frequency mode and a low frequency mode.
Figure 21:
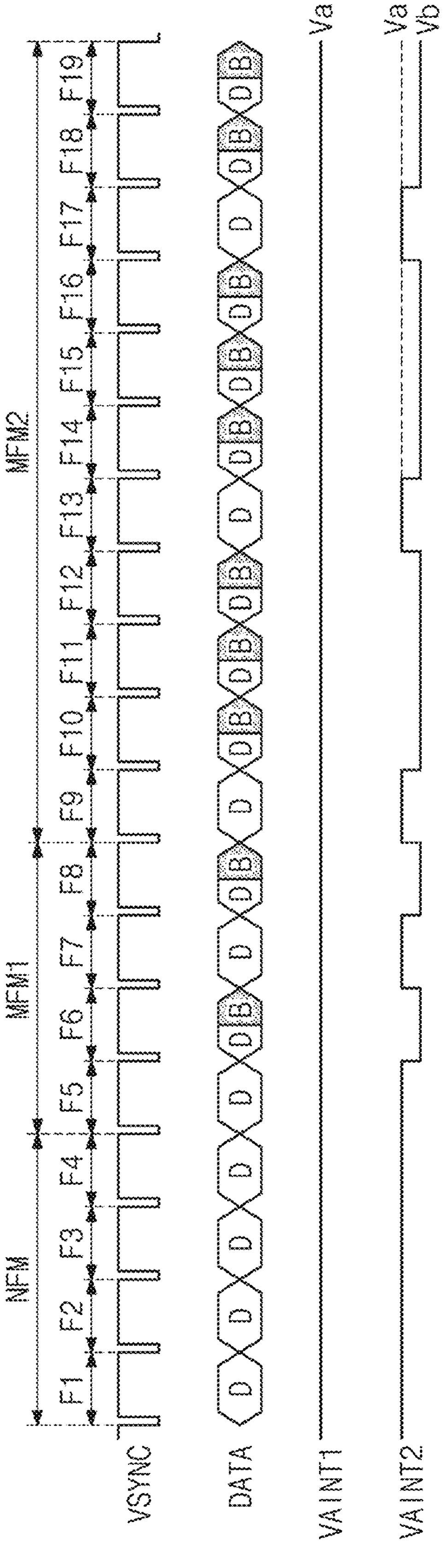
FIG. 21 illustrates changes in a first anode initialization voltage and a second anode initialization voltage in a single frequency mode and a multi-frequency mode.
Figure 22:
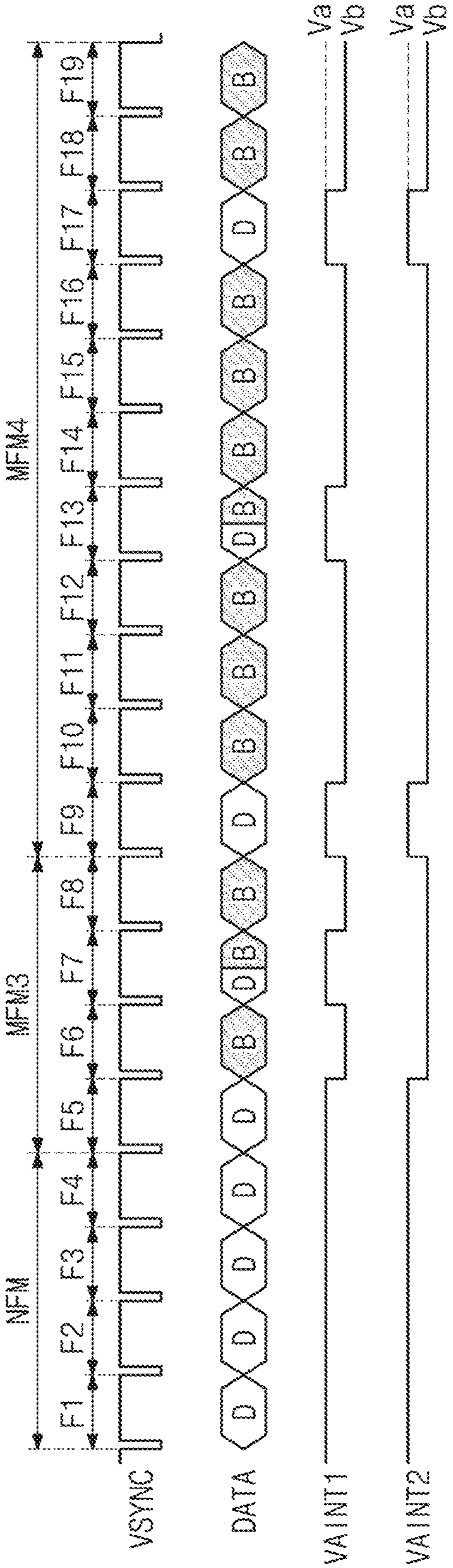
FIG. 22 illustrates changes in a first anode initialization voltage and a second anode initialization voltage in a single frequency mode and a multi-frequency mode.

FIGS. 20 to 22 are diagrams illustrating changes in the first anode initialization voltage VAINT1 and the second anode initialization voltage VAINT2 according to an operating mode.

Referring to FIGS. 17, 20, 21, and 22, the driving controller 100 may output an output image signal DATA in synchronization with a vertical synchronization signal VSYNC included in the control signal CTRL.

Furthermore, the driving controller 100 may output the voltage control signal VCTRL for changing a voltage level of each of the first anode initialization voltage VAINT1 and the second anode initialization voltage VAINT2 in synchronization with the vertical synchronization signal VSYNC.

In the following description, during the single frequency mode NFM, the driving controller 100 drives the first pixels PX1 in the first display area DA1 and the second pixels PX2 in the second display area DA2 at the first operating frequency. In an embodiment, the first operating frequency may be a reference frequency.

During a low frequency mode (LFM1, LMF2), the driving controller 100 may drive the first pixels PX1 in the first display area DA1 and the second pixels PX2 in the second display area DA2 at an operating frequency lower than the first operating frequency.

During a multi-frequency mode (MFM1, MMF2), the driving controller 100 may drive the first pixels PX1 in the first display area DA1 at a first operating frequency, and may drive the second pixels PX2 in the second display area DA2 at an operating frequency lower than the first operating frequency.

FIG. 20 illustrates changes in the first anode initialization voltage VAINT1 and the second anode initialization voltage VAINT2 in a single frequency mode and a low frequency mode.

In FIG. 20, the first to fourth frames F1 to F4 correspond to the single frequency mode NFM; the fifth to eighth frames F5 to F8 correspond to the first low frequency mode LFM1; and, the ninth to nineteenth frames F9 to F19 correspond to the second low frequency mode LFM2.

Referring to FIGS. 17 and 20, during the single frequency mode NFM, both the first pixels PX1 in the first display area DA1 of the display panel DP and the second pixels PX2 in the second display area DA2 of the display panel DP may be driven at a first operating frequency. The fact that the first pixels PX1 and the second pixels PX2 are driven at the first operating frequency means that each of the frequencies of scan signals GI1 to GIn, GC1 to GCn, and GW1 to GWn+1 and the emission control signals EM1 to EMn is the first operating frequency.

In the single frequency mode NFM, the driving controller 100 may output the output image signal DATA in synchronization with the vertical synchronization signal VSYNC. "D" of the output image signal DATA means a valid data signal having a predetermined grayscale level corresponding to the image signal RGB.

In the single frequency mode NFM, each of the first anode initialization voltage VAINT1 and the second anode initialization voltage VAINT2 may be maintained at a first voltage level Va.

In the first low frequency mode LFM1, the first pixels PX1 in the first display area DA1 and the second pixels PX2 in the second display area DA2 may be driven at a second operating frequency lower than the first operating frequency of the single frequency mode NFM. In an embodiment, when the first operating frequency is 120 Hz, the second operating frequency may be 60 Hz.

The driving controller 100 may output the valid data signal "D" as the output image signal DATA during some frames (i.e., fifth and seventh frames F5 and F7) in the first low frequency mode LFM1, and may output a bias signal "B" as the output image signal DATA during some other frames (i.e., sixth and eighth frames F6 and F8) in the first low frequency mode LFM1. The bias signal "B" may correspond to a predetermined voltage level for initializing the first electrode SE of the first transistor T1 illustrated in FIG. 18. The bias signal "B" may be referred to as an "invalid data signal" so as to be distinguished from the valid data signal "D".

In another embodiment, the driving controller 100 may not output the bias signal "B" as the output image signal DATA in the sixth and eighth frames F6 and F8. In this case, in the sixth and eighth frames F6 and F8, the output image signal DATA may be an invalid data signal (e.g., a data signal corresponding to a black grayscale).

During some frames (i.e., fifth and seventh frames F5 and F7) in the first low frequency mode LFM1, each of the first anode initialization voltage VAINT1 and the second anode initialization voltage VAINT2 may be maintained at the first voltage level Va.

During some other frames (i.e., sixth and eighth frames F6 and F8) in the first low frequency mode LFM1, each of the first anode initialization voltage VAINT1 and the second anode initialization voltage VAINT2 may be changed to a second voltage level Vb. In an embodiment, the second voltage level Vb of each of the first anode initialization voltage VAINT1 and the second anode initialization voltage VAINT2 is a voltage level lower than the first voltage level Va.

A parasitic capacitance Cpa may be present between the anode of the light emitting element ED shown in FIG. 18 and the scan line GWLj+1.

In the example shown in FIG. 9, when a voltage level of an anode terminal of the light emitting element ED is changed by a voltage level change of the scan signal GWj+1 delivered through the scan line GWLj+1 in a section (e.g., the second to 120th frames F2 to F120) where the scan signals GIj and GCj are maintained at a low level, the light emitting element ED may emit light. Such the undesired luminescence may affect display quality.

Therefore, in an embodiment, the voltage level change of the anode terminal of the light emitting element ED may be minimized by changing the voltage level of each of the first anode initialization voltage VAINT1 and the second anode initialization voltage VAINT2 to the second voltage level Vb lower than the first voltage level Va during frames (i.e., sixth and eighth frames F6 and F8) where the valid data signal "D" is not provided.

In an embodiment, the first voltage level Va may be −4.1 V, and the second voltage level Vb may be −4.2 V. In another embodiment, the second voltage level Vb of each of the first anode initialization voltage VAINT1 and the second anode initialization voltage VAINT2 may be a voltage level higher than the first voltage level Va.

The first voltage level Va and the second voltage level Vb of each of the first anode initialization voltage VAINT1 and the second anode initialization voltage VAINT2 may be changed to be suitable for the characteristics of the display panel DP.

In the second low frequency mode LFM2, the first pixels PX1 in the first display area DA1 and the second pixels PX2 in the second display area DA2 may be driven at a third operating frequency lower than the first operating frequency of the single frequency mode NFM. In an embodiment, when the first operating frequency is 120 Hz, the third operating frequency may be 30 Hz.

The driving controller 100 may output the valid data signal "D" as the output image signal DATA during some frames (i.e., ninth, thirteenth, seventeenth frames F9, F13, and F17) in the second low frequency mode LFM2, and may output the bias signal "B" as the output image signal DATA during some other frames (i.e., tenth, eleventh, twelfth, fourteenth, fifteenth, sixteenth, eighteenth, and nineteenth frames F10, F11, F12, F14, F15, F16, F18, and F19) in the second low frequency mode LFM2. The bias signal "B" may correspond to a predetermined voltage level for initializing the first electrode SE of the first transistor T1 shown in FIG. 18 and the first electrode SE of the first transistor T1 shown in FIG. 19.

During some frames (i.e., ninth, thirteenth, and seventeenth frames F9, F13, and F17) in the second low frequency mode LFM2, each of the first anode initialization voltage VAINT1 and the second anode initialization voltage VAINT2 may be maintained at a first voltage level Va.

During some other frames (i.e., tenth, eleventh, twelfth, fourteenth, fifteenth, sixteenth, eighteenth, and nineteenth frames F10, F11, F12, F14, F15, F16, F18, and F19) in the second low frequency mode LFM2, each of the first anode initialization voltage VAINT1 and the second anode initialization voltage VAINT2 may be changed to a second voltage level Vb. In an embodiment, the second voltage level Vb of each of the first anode initialization voltage VAINT1 and the second anode initialization voltage VAINT2 is a voltage level lower than the first voltage level Va.

FIG. 21 illustrates changes in the first anode initialization voltage VAINT1 and the second anode initialization voltage VAINT2 in a single frequency mode and a multi-frequency mode.

In FIG. 21, the first to fourth frames F1 to F4 correspond to the single frequency mode NFM; the fifth to eighth frames F5 to F8 correspond to a first multi-frequency mode MFM1; and, the ninth to nineteenth frames F9 to F19 correspond to a second multi-frequency mode MFM2.

Referring to FIGS. 17 and 21, during the single frequency mode NFM, both the first pixels PX1 in the first display area DA1 of the display panel DP and the second pixels PX2 in the second display area DA2 of the display panel DP may be driven at a first operating frequency.

In the single frequency mode NFM, the driving controller 100 may output the output image signal DATA in synchronization with the vertical synchronization signal VSYNC. "D" of the output image signal DATA means a valid data signal having a predetermined grayscale level corresponding to the image signal RGB.

In the single frequency mode NFM, each of the first anode initialization voltage VAINT1 and the second anode initialization voltage VAINT2 may be maintained at a first voltage level Va.

In the first multi-frequency mode MFM1, the first pixels PX1 in the first display area DA1 may be driven at the first operating frequency, and the second pixels PX2 in the second display area DA2 may be driven at a second operating frequency lower than the first operating frequency. In an embodiment, when the first operating frequency is 120 Hz, the second operating frequency may be 60 Hz.

The driving controller 100 may output the valid data signal "D" as the output image signal DATA during some frames (i.e., fifth and seventh frames F5 and F7) in the first multi-frequency mode MFM1.

The driving controller 100 may sequentially output the valid data signal "D" and the bias signal "B" as the output image signal DATA during each of some other frames (i.e., the sixth and eighth frames F6 and F8) in the first multi-frequency mode MFM1. During each of the sixth and eighth frames F6 and F8, the valid data signal "D" may be provided to the first pixels PX1 corresponding to the first display area DA1, and the bias signal "B" may be provided to the second pixels PX2 corresponding to the second display area DA2.

That is, the first pixels PX1 corresponding to the first display area DA1 may receive the valid data signal "D" during all frames (i.e., the fifth to eighth frames F5 to F8) in the first multi-frequency mode MFM1. The second pixels PX2 corresponding to the second display area DA2 may receive the valid data signal "D" during the fifth and seventh frames F5 and F7 in the first multi-frequency mode MFM1, and may receive the bias signal "B" during the sixth and eighth frames F6 and F8 in the first multi-frequency mode MFM1.

In the first multi-frequency mode MFM1, the first pixels PX1 corresponding to the first display area DA1 are driven at the first operating frequency, and thus the first anode initialization voltage VAINT1 is maintained at the first voltage level Va.

During some frames (i.e., the fifth and seventh frames F5 and F7) in the first multi-frequency mode MFM1, the second anode initialization voltage VAINT2 is maintained at the first voltage level Va. During some other frames (i.e., the sixth and eighth frames F6 and F8) in the first multi-frequency mode MFM1, the second anode initialization voltage VAINT2 may be changed to the second voltage level Vb. In an embodiment, the second voltage level Vb of the second anode initialization voltage VAINT2 is a voltage level lower than the first voltage level Va.

In an embodiment, during an inactive level of the vertical synchronization signal VSYNC (i.e., a vertical blank section), the second anode initialization voltage VAINT2 may be changed from the first voltage level Va to the second voltage level Vb.

In the second multi-frequency mode MFM2, the first pixels PX1 in the first display area DA1 may be driven at the first operating frequency, and the second pixels PX2 in the second display area DA2 may be driven at a third operating frequency lower than the first operating frequency. In an embodiment, when the first operating frequency is 120 Hz, the third operating frequency may be 30 Hz.

The driving controller 100 may output the valid data signal "D" as the output image signal DATA during some frames (i.e., ninth, thirteenth, seventeenth frames F9, F13, and F17) in the second multi-frequency mode MFM2, and may alternately output the valid data signal "D" and the bias signal "B" as the output image signal DATA during each of some other frames (i.e., tenth, eleventh, twelfth, fourteenth, fifteenth, sixteenth, eighteenth, and nineteenth frames F10, F11, F12, F14, F15, F16, F18, and F19) in the second multi-frequency mode MFM2.

That is, the first pixels PX1 corresponding to the first display area DA1 receive the valid data signal "D" during all frames (i.e., the ninth to nineteenth frames F9 to F19) in the second multi-frequency mode MFM2. The second pixels PX2 corresponding to the second display area DA2 may receive the valid data signal "D" during the ninth, thirteenth and seventeenth frames F9, F13 and F17 in the second multi-frequency mode MFM2, and may receive the bias signal "B" during the tenth, eleventh, twelfth, fourteenth, fifteenth, sixteenth, eighteenth, and nineteenth frames F10, F11, F12, F14, F15, F16, F18, and F19.

In the second multi-frequency mode MFM2, the first anode initialization voltage VAINT1 is maintained at the first voltage level Va.

During some frames (i.e., the ninth, thirteenth, and seventeenth frames F9, F13, and F17) in the second multi-frequency mode MFM2, the second anode initialization voltage VAINT2 may be maintained at the first voltage level Va.

During some other frames (i.e., the tenth, eleventh, twelfth, fourteenth, fifteenth, sixteenth, eighteenth, and nineteenth frames F10, F11, F12, F14, F15, F16, F18, and F19) in the second multi-frequency mode MFM2, the second anode initialization voltage VAINT2 may be changed to the second voltage level Vb. In an embodiment, the second voltage level Vb of the second anode initialization voltage VAINT2 is a voltage level lower than the first voltage level Va.

In the example shown in FIG. 21, in the single frequency mode NFM, the first multi-frequency mode MFM1, and the second multi-frequency mode MFM2, in each of which the first pixels PX1 corresponding to the first display area DA1 are driven at the first operating frequency, the first anode initialization voltage VAINT1 may be maintained at the first voltage level Va.

During each of the frames F1 to F5, F7, F9, F13, and F17 where the valid data signal "D" is provided as the output image signal DATA to the second pixels PX2 corresponding to the second display area DA2, the second anode initialization voltage VAINT2 may be maintained at the first voltage level Va.

During the frames F6, F8, F10, F11, F12, F14, F15, F16, F18, and F19 (i.e., the sixth frame F6, the eighth frame F8, the tenth frame F10, during which the bias signal "B" is provided as the output image signal DATA to the second pixels PX2 corresponding to the second display area DA2, the second anode initialization voltage VAINT2 may be changed to the second voltage level Vb.

FIG. 22 illustrates changes in the first anode initialization voltage VAINT1 and the second anode initialization voltage VAINT2 in a single frequency mode and a multi-frequency mode.

In FIG. 22, the first to fourth frames F1 to F4 correspond to the single frequency mode NFM; the fifth to eighth frames F5 to F8 correspond to a third multi-frequency mode MFM3; and, the ninth to nineteenth frames F9 to F19 correspond to a fourth multi-frequency mode MFM4.

Referring to FIGS. 17 and 22, during the single frequency mode NFM, both the first pixels PX1 in the first display area DA1 of the display panel DP and the second pixels PX2 in the second display area DA2 of the display panel DP may be driven at a first operating frequency.

In the single frequency mode NFM, the driving controller 100 may output the output image signal DATA in synchronization with the vertical synchronization signal VSYNC. "D" of the output image signal DATA means a valid data signal having a predetermined grayscale level corresponding to the image signal RGB.

In the single frequency mode NFM, each of the first anode initialization voltage VAINT1 and the second anode initialization voltage VAINT2 may be maintained at a first voltage level Va.

In the third multi-frequency mode MFM3, the first pixels PX1 in the first display area DA1 may be driven at a second operating frequency lower than a first operating frequency, and the second pixels PX2 in the second display area DA2 may be driven at a third operating frequency lower than the second operating frequency. In an embodiment, when the first operating frequency is 120 Hz, the second operating frequency may be 60 Hz, and the third operating frequency may be Hz.

The driving controller 100 outputs the valid data signal "D" as the output image signal DATA during the fifth frame F5 in the third multi-frequency mode MFM3.

The driving controller 100 may sequentially output the valid data signal "D" and the bias signal "B" as the output image signal DATA during the seventh frame F7 in the third multi-frequency mode MFM3.

The driving controller 100 may output the bias signal "B" as the output image signal DATA during the sixth and eighth frames F6 and F8 in the third multi-frequency mode MFM3.

That is, the first pixels PX1 corresponding to the first display area DA1 receive the valid data signal "D" during the fifth and seventh frames F5 and F7 in the third multi-frequency mode MFM3.

The second pixels PX2 corresponding to the second display area DA2 may receive the valid data signal "D" during the fifth frame F5 in the third multi-frequency mode MFM3 and may receive the bias signal "B" during the sixth to eighth frames F6 to F8 in the third multi-frequency mode MFM3.

During the fifth and seventh frames F5 and F7 in the third multi-frequency mode MFM3, the first anode initialization voltage VAINT1 is maintained at the first voltage level Va. During the sixth and eighth frames F6 and F8, the first anode initialization voltage VAINT1 is changed to the second voltage level Vb.

During the fifth frame F5 in the third multi-frequency mode MFM3, the second anode initialization voltage VAINT2 is maintained at the first voltage level Va. During the sixth to eighth frames F6 to F8 in the third multi-frequency mode MFM3, the second anode initialization voltage VAINT2 may be changed to the second voltage level Vb. In an embodiment, the second voltage level Vb of the second anode initialization voltage VAINT2 is a voltage level lower than the first voltage level Va.

In an embodiment, during an inactive level of the vertical synchronization signal VSYNC (i.e., a vertical blank section), the second anode initialization voltage VAINT2 may be changed from the first voltage level Va to the second voltage level Vb.

In the fourth multi-frequency mode MFM4, the first pixels PX1 in the first display area DA1 may be driven at a third operating frequency lower than a first operating frequency, and the second pixels PX2 in the second display area DA2 may be driven at a fourth operating frequency lower than the third operating frequency. In an embodiment, when the first operating frequency is 120 Hz, the third operating frequency may be 30 Hz, and the fourth operating frequency may be 15 Hz.

The driving controller 100 may output the valid data signal "D" as the output image signal DATA during the ninth and seventeenth frames F9 and F17 in the fourth multi-frequency mode MFM4.

The driving controller 100 may alternately output the valid data signal "D" and the bias signal "B" as the output image signal DATA during the thirteenth frame F13 in the fourth multi-frequency mode MFM4.

The driving controller 100 may output the bias signal "B" as the output image signal DATA during each of the tenth, eleventh, twelfth, fourteenth, fifteenth, sixteenth, eighteenth, and nineteenth frames F10, F11, F12, F14, F15, F16, F18, and F19.

In the fourth multi-frequency mode MFM4, the first anode initialization voltage VAINT1 is set to the first voltage level Va during each of the ninth, thirteenth, and seventeenth frames F9, F13, and F17, during which the valid data signal "D" is provided as the output image signal DATA to the first pixels PX1 in the first display area DA1; and, the first anode initialization voltage VAINT1 is set to the second voltage level Vb during each of the tenth, eleventh, twelfth, fourteenth, fifteenth, sixteenth, eighteenth, and nineteenth frames F10, F11, F12, F14, F15, F16, F18, and F19.

In the fourth multi-frequency mode MFM4, the second anode initialization voltage VAINT2 is set to the first voltage level Va during each of the ninth and seventeenth frames F9 and F17, during which the valid data signal "D" is provided as the output image signal DATA to the second pixels PX2 in the second display area DA2; and, the second anode initialization voltage VAINT2 is set to the second voltage level Vb during each of the tenth, eleventh, twelfth, thirteenth, fourteenth, fifteenth, sixteenth, eighteenth, and nineteenth frames F10, F11, F12, F13, F14, F15, F16, F18, and F19.

The voltage level change of the anode terminal of the light emitting element ED may be minimized by changing the voltage level of each of the first anode initialization voltage VAINT1 and the second anode initialization voltage VAINT2 to the second voltage level Vb lower than the first voltage level Va during frames where the valid data signal "D" is not provided.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

A display device having such a configuration may operate in a multi-frequency mode in which a first display area is driven at a first operating frequency and a second display area is driven at a second operating frequency. Accordingly, power consumption of the display device may be reduced. A luminance difference between the first display area and the second display area may be prevented from being visually perceived, by compensating for characteristic changes of pixels in the second display area in the multi-frequency mode. Accordingly, the power consumption of the display device may be reduced and display quality may be prevented from being deteriorated.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels and divided into a first display area which operates at a first operating frequency and a second display area which operates at a second operating frequency; and a voltage generator, which provides an anode initialization voltage to the plurality of pixels, wherein, in an operation mode, the anode initialization voltage has a first voltage level when pixels corresponding to the first display area among the plurality of pixels are driven, and wherein, in the operation mode, the anode initialization voltage has a second voltage level different from the first voltage level when pixels corresponding to the second display area among the plurality of pixels are driven.

2. The display device of claim 1, further comprising:

a driving controller, which:

determines the operation mode; and when the operation mode is a multi-frequency mode, outputs a voltage control signal for changing a voltage level of the anode initialization voltage at which the second display area is driven, wherein the voltage generator outputs the anode initialization voltage in response to the voltage control signal.

3. The display device of claim 1, wherein the second operating frequency is lower than the first operating frequency, and wherein the second voltage level of the anode initialization voltage is higher than the first voltage level.

4. The display device of claim 1, wherein, when a part of the first display area adjacent to the second display area and a part of the second display area adjacent to the first display area are driven, the anode initialization voltage is changed step by step from the first voltage level to the second voltage level.

5. The display device of claim 1, wherein each of the plurality of pixels includes:

a light emitting element including an anode and a cathode; and a transistor connected between the anode of the light emitting element and a voltage line, wherein the anode initialization voltage is provided from the voltage line to the anode of the light emitting element through the transistor.

6. The display device of claim 1, further comprising:

a first voltage line electrically connected to the pixels corresponding to the first display area; and a second voltage line electrically connected to the pixels corresponding to the second display area, wherein the anode initialization voltage includes a first anode initialization voltage and a second anode initialization voltage, and the voltage generator provides the first anode initialization voltage to the first voltage line and provides the second anode initialization voltage to the second voltage line.

7. The display device of claim 6, wherein, while the pixels of the second display area is driven when the second operating frequency is lower than the first operating frequency, a voltage level of the second anode initialization voltage is lower than a voltage level of the first anode initialization voltage.

8. The display device of claim 6, wherein, when the second operating frequency is identical to the first operating frequency, the first anode initialization voltage and the second anode initialization voltage are at a same voltage level.

9. The display device of claim 6, wherein each of the pixels corresponding to the first display area includes:

a light emitting element including an anode and a cathode; and a transistor connected between the anode of the light emitting element and the first voltage line.

10. The display device of claim 6, wherein each of the pixels corresponding to the second display area includes:

a light emitting element including an anode and a cathode; and a transistor connected between the anode of the light emitting element and the second voltage line.

11. The display device of claim 1, wherein the anode initialization voltage has the first voltage level during a first frame in a multi-frequency mode, wherein the anode initialization voltage has the first voltage level when the pixels corresponding to the first display area are driven during a second frame different from the first frame of the multi-frequency mode, and wherein the anode initialization voltage has the second voltage level when the pixels corresponding to the second display area are driven during the second frame of the multi-frequency mode.

12. A display device comprising:

a display panel divided into a first display area and a second display area and including a first pixel positioned in the first display area and a second pixel positioned in the second display area;

a voltage generator, which provides a first anode initialization voltage to the first pixel in response to a voltage control signal and provides a second anode initialization voltage to the second pixel in response to the voltage control signal; and a driving controller, which:

determines an operation mode;

drives the first pixel at a first operating frequency and drives the second pixel at a second operating frequency; and outputs the voltage control signal, wherein, when the operation mode is a multi-frequency mode, the first anode initialization voltage has a first voltage level and the second anode initialization voltage has a second voltage level different from the first voltage level.

13. The display device of claim 12, wherein, during a first frame of the multi-frequency mode, the driving controller provides a valid data signal to the first pixel and the second pixel, and wherein, during a second frame of the multi-frequency mode, the driving controller provides the valid data signal to the first pixel and provides an invalid data signal to the second pixel.

14. The display device of claim 12, wherein in the multi-frequency mode, the second operating frequency is lower than the first operating frequency, and wherein the second voltage level of the second anode initialization voltage is lower than the first voltage level of the first anode initialization voltage.

15. The display device of claim 12, wherein the driving controller outputs the voltage control signal in synchronization with a vertical synchronization signal, wherein in the multi-frequency mode, the second anode initialization voltage is changed from the first voltage level to the second voltage level during a blank section of the vertical synchronization signal.

16. The display device of claim 12, wherein, when the operation mode is a low frequency mode, the driving controller drives each of the first pixel and the second pixel at a third operating frequency lower than the first operating frequency, wherein the driving controller provides a valid data signal to the first pixel and the second pixel during a first frame in the low frequency mode, provides an invalid data signal to the first pixel and the second pixel during a second frame in the low frequency mode, wherein, during the first frame in the low frequency mode, each of the first anode initialization voltage and the second anode initialization voltage has the first voltage level, and wherein, during the second frame in the low frequency mode, each of the first anode initialization voltage and the second anode initialization voltage has the second voltage level.

17. The display device of claim 12, wherein, when the operation mode is a single frequency mode, the first operating frequency is identical to the second operating frequency, wherein the driving controller provides a valid data signal to the first pixel and the second pixel during each frame in the single frequency mode, and wherein each of the first anode initialization voltage and the second anode initialization voltage has the first voltage level during each frame in the single frequency mode.

18. The display device of claim 12, further comprising:

a first voltage line electrically connected to the first pixel; and a second voltage line electrically connected to the second pixel, wherein the voltage generator provides the first anode initialization voltage to the first voltage line and provides the second anode initialization voltage to the second voltage line.

19. The display device of claim 18, wherein the first pixel includes:

a light emitting element including an anode and a cathode; and a transistor connected between the anode of the light emitting element and the first voltage line.

20. The display device of claim 18, wherein the second pixel includes:

a light emitting element including an anode and a cathode; and a transistor connected between the anode of the light emitting element and the second voltage line.

* * * * *